United States Patent
Punj et al.

(10) Patent No.: US 10,944,652 B2
(45) Date of Patent: Mar. 9, 2021

(54) METHOD AND NETWORK DEVICE FOR TAGGING NETWORK TRAFFIC FLOWS

(71) Applicant: Arista Networks, Inc., Santa Clara, CA (US)

(72) Inventors: Arun Punj, Cupertino, CA (US); Ripon Bhattacharjee, Fremont, CA (US); Sundar Siddaramaiah Bettadahalli, Fremont, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 16/414,354

(22) Filed: May 16, 2019

(65) Prior Publication Data

US 2020/0366578 A1 Nov. 19, 2020

(51) Int. Cl.
*H04L 12/26* (2006.01)
(52) U.S. Cl.
CPC ............ *H04L 43/04* (2013.01); *H04L 43/026* (2013.01); *H04L 43/028* (2013.01)
(58) Field of Classification Search
CPC ...... H04L 43/04; H04L 43/026; H04L 43/028
See application file for complete search history.

(56) References Cited

U.S. PATENT DOCUMENTS 10,326,803 B1 * 6/2019 Haney ................. H04L 63/30

OTHER PUBLICATIONS

R. Hofstede et al., "Flow Monitoring Explained: From Packet Capture to Data Analysis With NetFlow and IPFIX," in IEEE Communications Surveys & Tutorials, vol. 16, No. 4, pp. 2037-2064, Fourthquarter 2014, doi: 10.1109/COMST.2014.2321898. (Year: 2014).*
B. Claise, Ed. et al., "Specification of the IP Flow Information Export (IPFIX) Protocol for the Exchange of Flow Information", Internet Engineering Task Force (IETF), ISSN: 2070-1721, Obsoletes RFC5101, Cisco Systems, Sep. 2013. (Year: 2013).*
B. Claise et al.; "Specification of the IP Flow Information Export (IPFIX) Protocol for the Exchange of Flow Information"; STD 77, RFC 7011; ISSN: 2070-1721; Sep. 2013; http://www.rfc-editor.org/info/rfc7011.

* cited by examiner

*Primary Examiner* — Kristie D Shingles
(74) *Attorney, Agent, or Firm* — Chamberlain, Hrdlicka, White, Williams & Aughtry

(57) ABSTRACT

A method and network device for tagging network traffic flows. Specifically, the method and system disclosed herein entail the incorporation of static user-defined tag information, as well as dynamic screener-defined tag information (if appropriate), into flow tracking information exported from flow tracking-capable network devices to one or more flow collectors. Incorporation of the aforementioned tag information enhances the ability of the flow collector(s) to index, as well as retrieve, the flow tracking information. Through enhanced indexing and retrieval, speedier analysis of the flow tracking information, by one or more flow analyzers, may also be possible.

20 Claims, 15 Drawing Sheets

METHOD AND NETWORK DEVICE FOR TAGGING NETWORK TRAFFIC FLOWS

BACKGROUND

Network administrators are often interested in understanding how packets flow through the network devices within a network. To understand the flow of packets through the network, the network administrators use tools to capture network traffic flow information. However, conventional tools used to capture network traffic flow information often do not capture the aforementioned information at a sufficient level of detail to enable network administrators to performing meaningful analysis.

SUMMARY

In general, in one aspect, the technology relates to a method for exporting flow tracking information. The method includes receiving a network traffic flow including a data packet, generating a lookup key using at least a set of packet internal qualifiers extracted from the data packet, obtaining, based on the lookup key, a flow value, a flow key corresponding to the flow value, and a user-defined metadata key-value pair including a user-defined metadata key mapped to a user-defined metadata value, and exporting a first portion of the flow tracking information including the flow key and the user-defined metadata key and a second portion of the flow tracking information including the flow value and the user-defined metadata value.

In general, in one aspect, the technology relates to a network device. The network device includes a computer processor programmed to receive a network traffic flow including a data packet, generate a lookup key using at least a set of packet internal qualifiers extracted from the data packet, obtain, based on the lookup key, a flow value, a flow key corresponding to the flow value, and a user-defined metadata key-value pair including a user-defined metadata key mapped to a user-defined metadata value, and export a first portion of the flow tracking information including the flow key and the user-defined metadata key and a second portion of the flow tracking information including the flow value and the user-defined metadata value.

In general, in one aspect, the technology relates to a non-transitory computer readable medium (CRM). The CRM includes computer readable program code, which when executed by a computer processor, enables the computer processor to receive a network traffic flow including a data packet, generate a lookup key using at least a set of packet internal qualifiers extracted from the data packet, obtain, based on the lookup key, a flow value, a flow key corresponding to the flow value, and a user-defined metadata key-value pair including a user-defined metadata key mapped to a user-defined metadata value, and export a first portion of the flow tracking information including the flow key and the user-defined metadata key and a second portion of the flow tracking information including the flow value and the user-defined metadata value.

Other aspects will be apparent from the following description and the appended claims.

DETAILED DESCRIPTION

Figure 1:
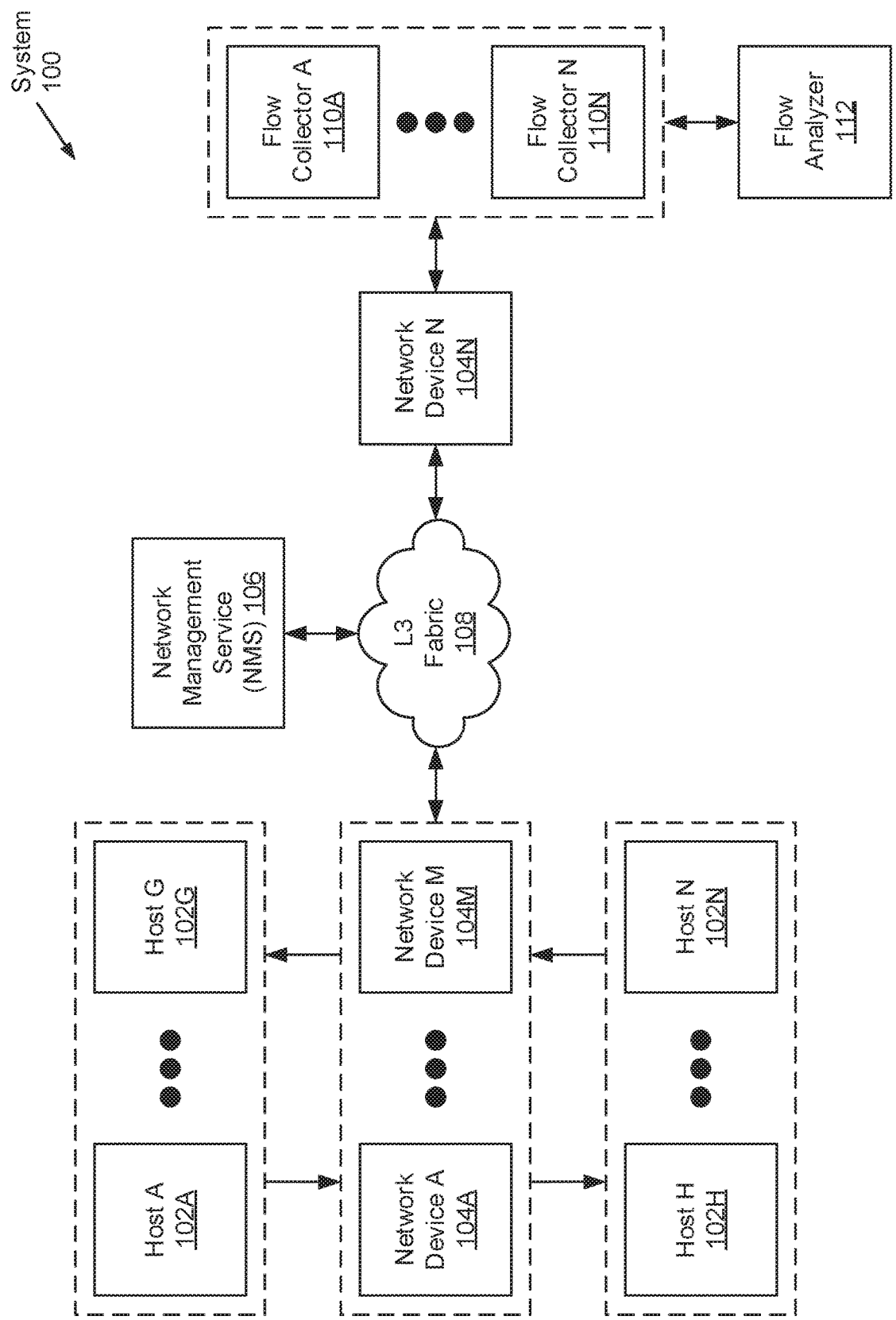
FIG. 1 shows a system in accordance with one or more embodiments.

Specific embodiments will now be described in detail with reference to the accompanying figures. In the following detailed description of the embodiments, numerous specific details are set forth in order to provide a more thorough understanding. However, it will be apparent to one of ordinary skill in the art that the invention may be practiced without these specific details. In other instances, well-known features have not been described in detail to avoid unnecessarily complicating the description.

In the following description of FIGS. 1-6B, any component described with regard to a figure, in various embodiments, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout the application, the phrase 'operatively connected' may be used to describe a connection between components. As used hereinafter, the aforementioned phrase may refer to any direct (e.g., wired directly between two or more components) or indirect (e.g., wired and/or wireless connections between any number of components connection the operatively connected components) connection.

In general, embodiments relate to a method and network device for tagging network traffic flows. Specifically, one or more embodiments entails the incorporation of static user-defined tag information, as well as dynamic screener-defined tag information (if appropriate), into flow tracking information exported from flow tracking-capable network devices to one or more flow collectors. Incorporation of the aforementioned tag information enhances the ability of the flow collector(s) to index, as well as retrieve, the flow tracking information. Through enhanced indexing and retrieval, speedier analysis of the flow tracking information, by one or more flow analyzers, may also be possible.

FIG. 1 shows a system in accordance with one or more embodiments. The system (100) may include multiple hosts (102A-102N) operatively connected to one another through multiple, interconnected network devices (104A-104M). These network devices (104A-104M) may operatively connect to other, remote network devices (104N) and a network management service (NMS) (106) through a layer-3 (L3) fabric (108). Further, the aforementioned remote network device(s) (104N) may operatively connect to one or more flow collectors (110A-110N), which in turn, may operatively connect to a flow analyzer (112). Each of these components is described below.

In one embodiment, a host (102A-102N) may represent any physical computing system (e.g., implemented through software and computer hardware) that may be configured to generate, send, receive, and/or process requests and replies, either locally or over a network. A host (102A-102N) may include one or more computer processors, memory, and two or more physical network interfaces (also referred to as ports). Further, a host (102A-102N) may include functionality to generate, receive, and/or transmit network traffic (e.g., data packets). Examples of a host (102A-102N) may include, but are not limited to, a server (e.g., a database server, a dynamic host configuration protocol (DHCP) server, an application server, a file server, a print server, a mail server, or any other server), a desktop computer, a mobile device (e.g., a laptop computer, a smartphone, a personal digital assistant (PDA), a tablet computer, or any other mobile device), or any other type of computing system that includes at least the aforementioned minimum requirements.

In one embodiment, a network device (104A-104N) may represent a physical computing system that facilitates communication and interaction between endpoints of the system (100) (e.g., hosts (102A-102N), flow collectors (110A-110N), etc.). Further, a network device (104A-104N) may include persistent storage, memory (e.g., random access memory (RAM), shared memory, etc.), one or more computer processors (e.g., integrated circuits, a switch chip, or network processor), and two or more physical network interfaces (also referred to as ports). The computer processor(s) may be programmed to determine out of which network interface on the network device (104A-104N) to forward network traffic (e.g., data packets). To that extent, in general, a network device (104A-104N) may include functionality to receive network traffic (e.g., data packets) from an origin or previous hop through network interfaces or ports, and determine whether to: (a) drop the network traffic; (b) process the network traffic in accordance with a configuration of the network device (104A-104N); and/or (c) send the network traffic, based on the processing, out through other network interfaces or ports to a destination or next hop. In one embodiment, a network device (104A-104N) may include further functionality to aggregate and export flow tracking information (described below) to one or more flow collectors (110A-110N).

In one embodiment, how a network device (104A-104N) processes network traffic may depend, at least in part, on whether the network device (104A-104N) operates as a layer-2 (L2) switch or a L3 switch (also referred to as a multilayer switch), which may perform at least some functions of a router. If the network device (104A-104N) operates as a L2 switch, the network device (104A-104N) may use a destination media access control (MAC) address along with one or more forwarding data structures and/or policies to determine out of which network interface or port to send the network traffic towards a next hop (e.g., another network device) or a destination (e.g., an endpoint). Alternatively, if the network device (104A-104N) operates as a L3 switch, the network device (104A-104N) may use a destination Internet Protocol (IP) address along with one or more routing data structures and/or policies to determine out of which network interface or port to send the network traffic towards a next hop or destination. Furthermore, if the network device (104A-104N) operates as a multilayer switch, the network device (104A-104N) may include functionality to process network traffic using both MAC addresses and IP addresses.

Figure 5A:
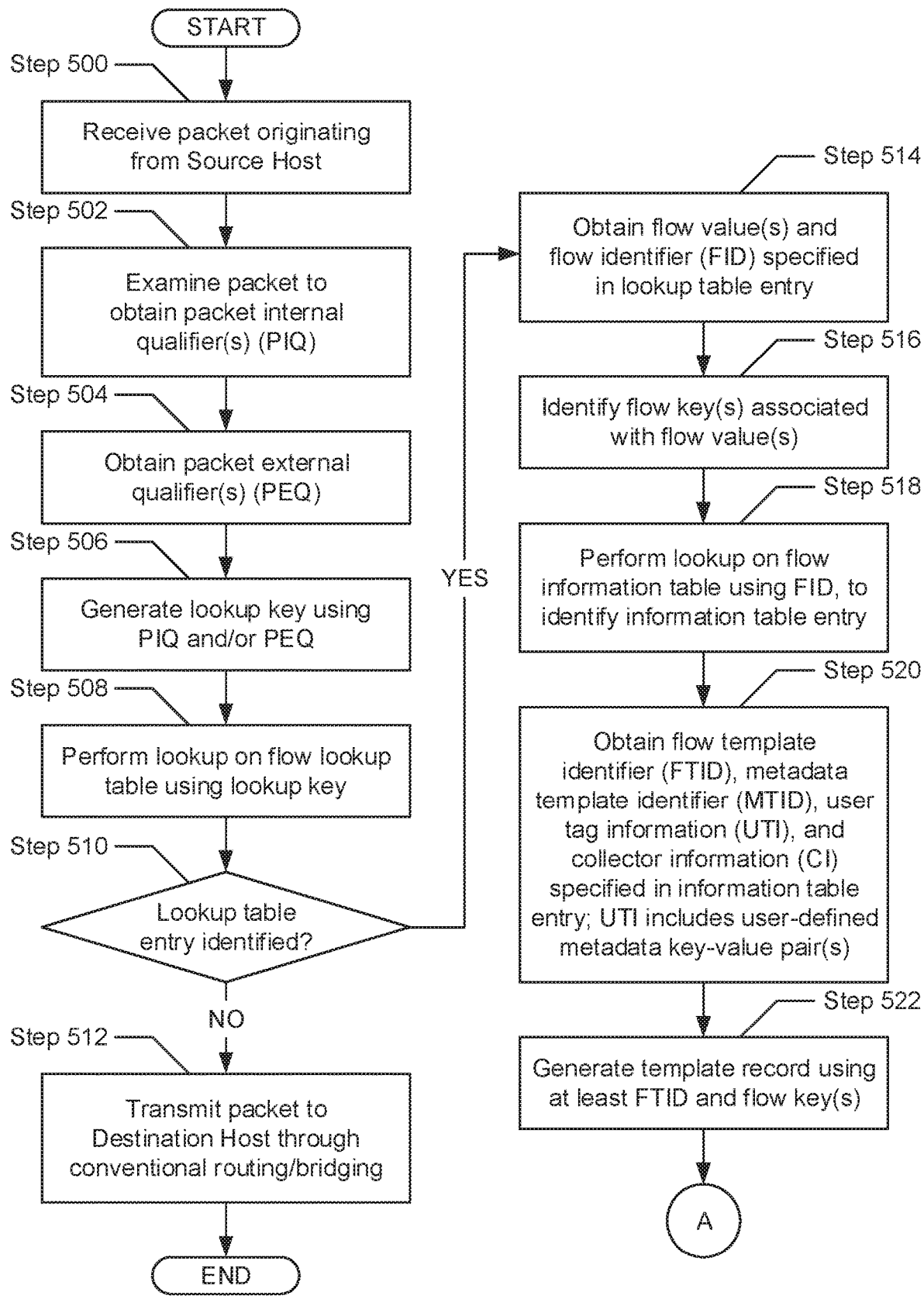
FIGS. 5A-5C show flowcharts describing a method for exporting flow tracking information in accordance with one or more embodiments.
Figure 5B:
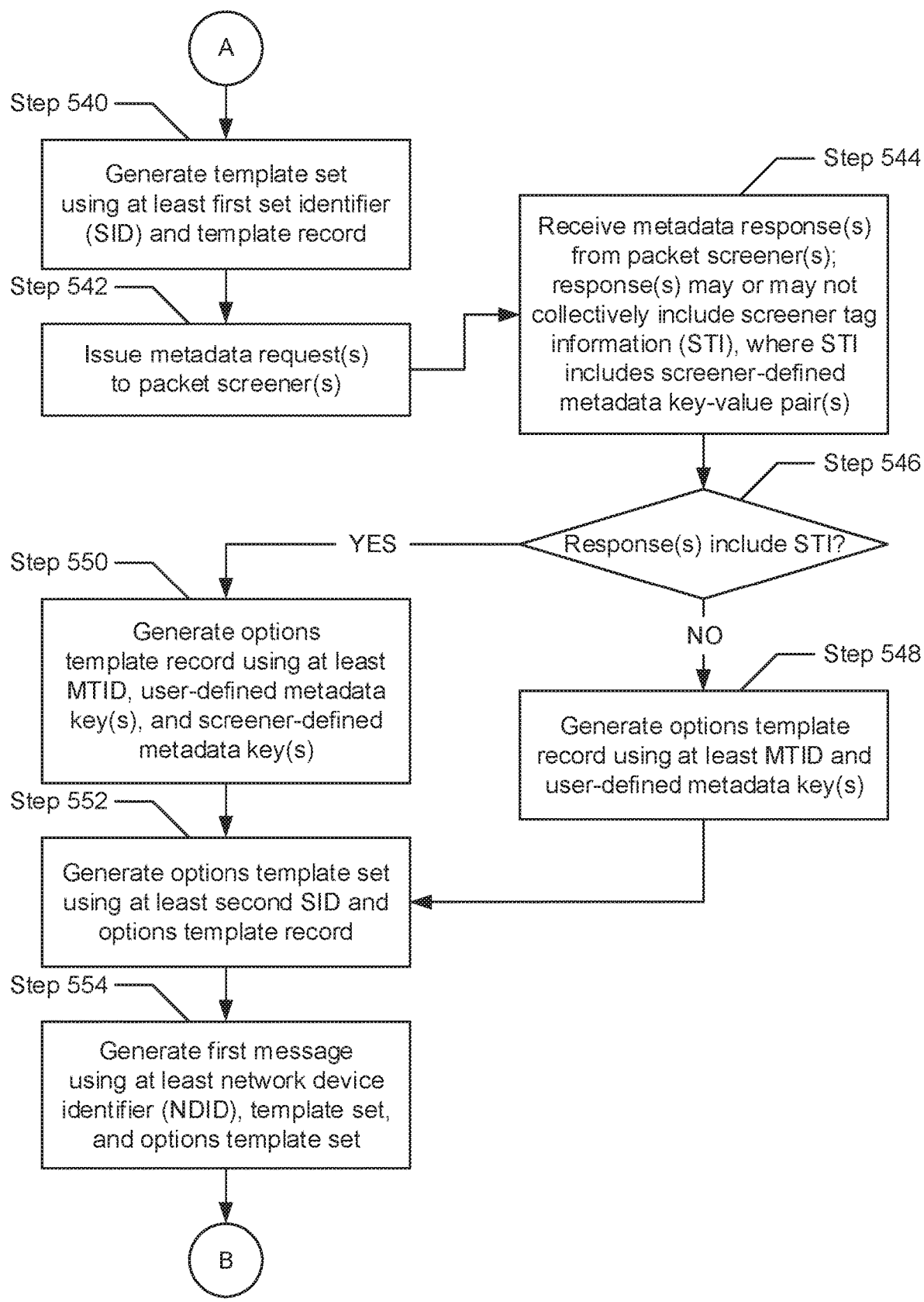
Figure 5C:
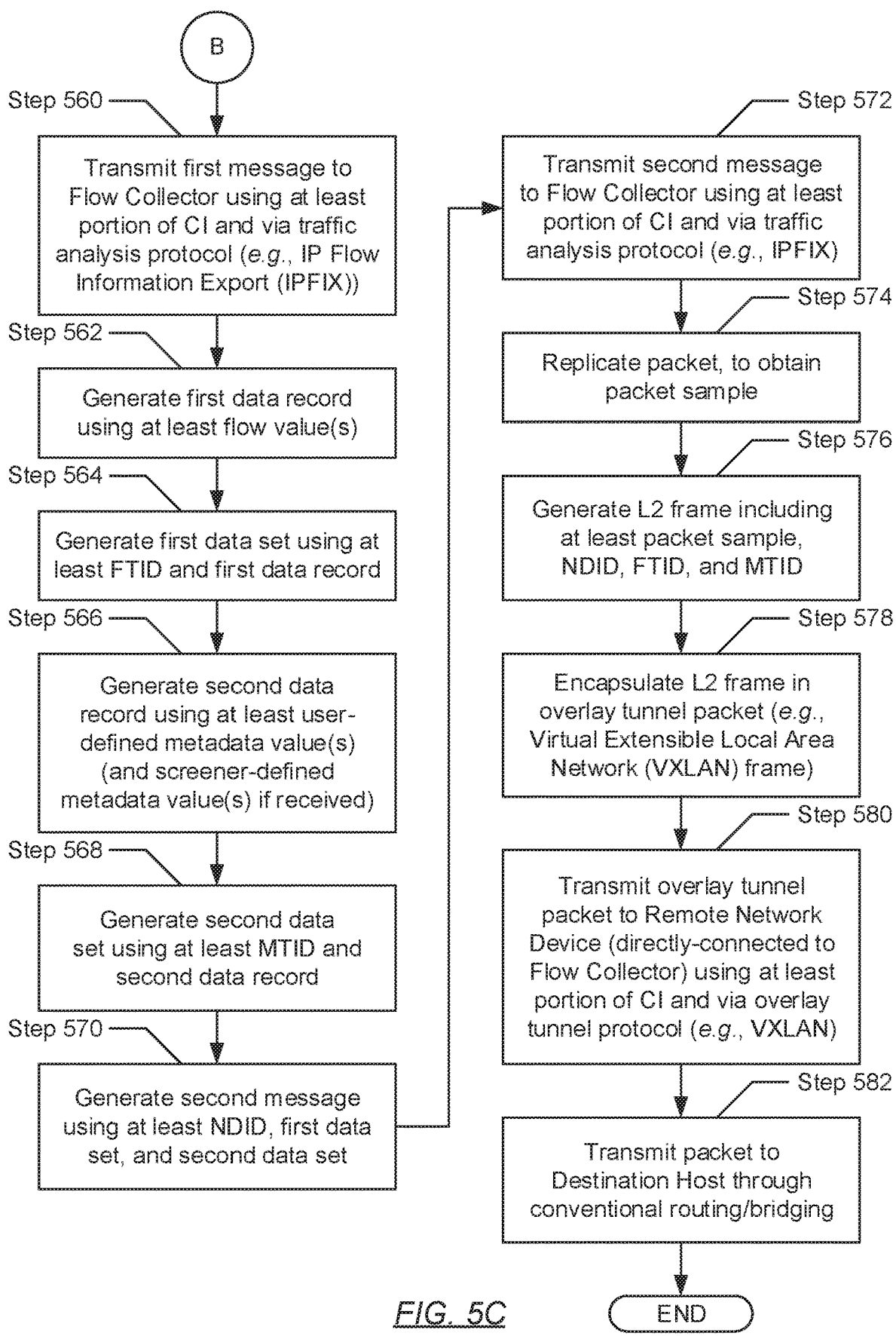

In one embodiment, the persistent storage on a network device (104A-104N) may include any type of non-transitory computer readable medium that includes instructions (or computer readable program code), which when executed by the computer processor(s), enable the network device (104A-104N) to perform any of the functionalities described herein (see e.g., FIGS. 5A-5C). Moreover, examples of a network device (104A-104N) may include, but are not limited to, a switch, a router, and a multilayer switch. Further, a network device (104A-104N) is not limited to the aforementioned specific examples. Network devices (104A-104N) are described in further detail below with respect to FIG. 2A.

In one embodiment, the NMS (106) may represent a platform for the centralized management of and/or consolidation of state information for all or a portion of the network devices (104A-104N) in the system (100). The NMS (106) may be implemented on one or more servers (not shown). Each server may be a physical server (e.g., within a datacenter) or a virtual server (e.g., residing in a cloud computing environment). Furthermore, the NMS (106) may enable network administrators to configure, or otherwise interact, with the various network devices (104A-104N) of the system (100).

In one embodiment, the L3 fabric (108) may represent a set of interconnected network devices or systems, which operatively connect the NMS (106) to all or a portion of the network devices (104A-104N) in the system (100). Subsequently, the L3 fabric (108) may include functionality to facilitate communications between these aforementioned components. Further, the L3 fabric (108) may include any combination of local area network (LAN) and/or wide area network (WAN) (e.g., Internet) segments, which may employ any combination of wired and/or wireless connections and communication protocols.

In one embodiment, a flow collector (110A-110N) may represent a physical computing system (e.g., an appliance or a server) that receives and stores flow tracking information exported by one or more network devices (104A-104N). Flow tracking information may refer to statistical, infrastructure, routing, and/or other information descriptive of traffic flows, between endpoints (e.g., a source host and a destination host), that traverses one or more network devices (104A-104N) configured to collect and export such information. Further, a flow collector (110A-110N) may be implemented on one or more physical or virtual devices, which may include at least one or more processors, memory, two or more physical network interfaces (or ports), and a data repository. In one embodiment, a flow collector (110A-110N) may further include executable instructions (or computer readable program code) that may be stored in non-transitory computer readable media, which when executed, enable the flow collector (110A-110N) to perform any of the functionalities described herein (see e.g., FIGS. 6A and 6B). Flow collectors (110A-110N) are described in further detail below with respect to FIG. 2B.

In one embodiment, a flow analyzer (112) may represent a physical or virtual computing system (e.g., implemented through software and/or computer hardware) that may be configured to analyze any flow tracking information consolidated on one or more flow collectors (110A-110N). The analysis of flow tracking information may be geared, for example, towards network performance monitoring, troubleshooting, capacity planning, and intrusion detection and/or prevention. Furthermore, following these analyses, a flow analyzer (112) may also include functionality to provide the results of these analyses to network administrators through various tools and visualizations.

While FIG. 1 shows a configuration of components, other system configurations may be used without departing from the scope of the technology.

Figure 2A:
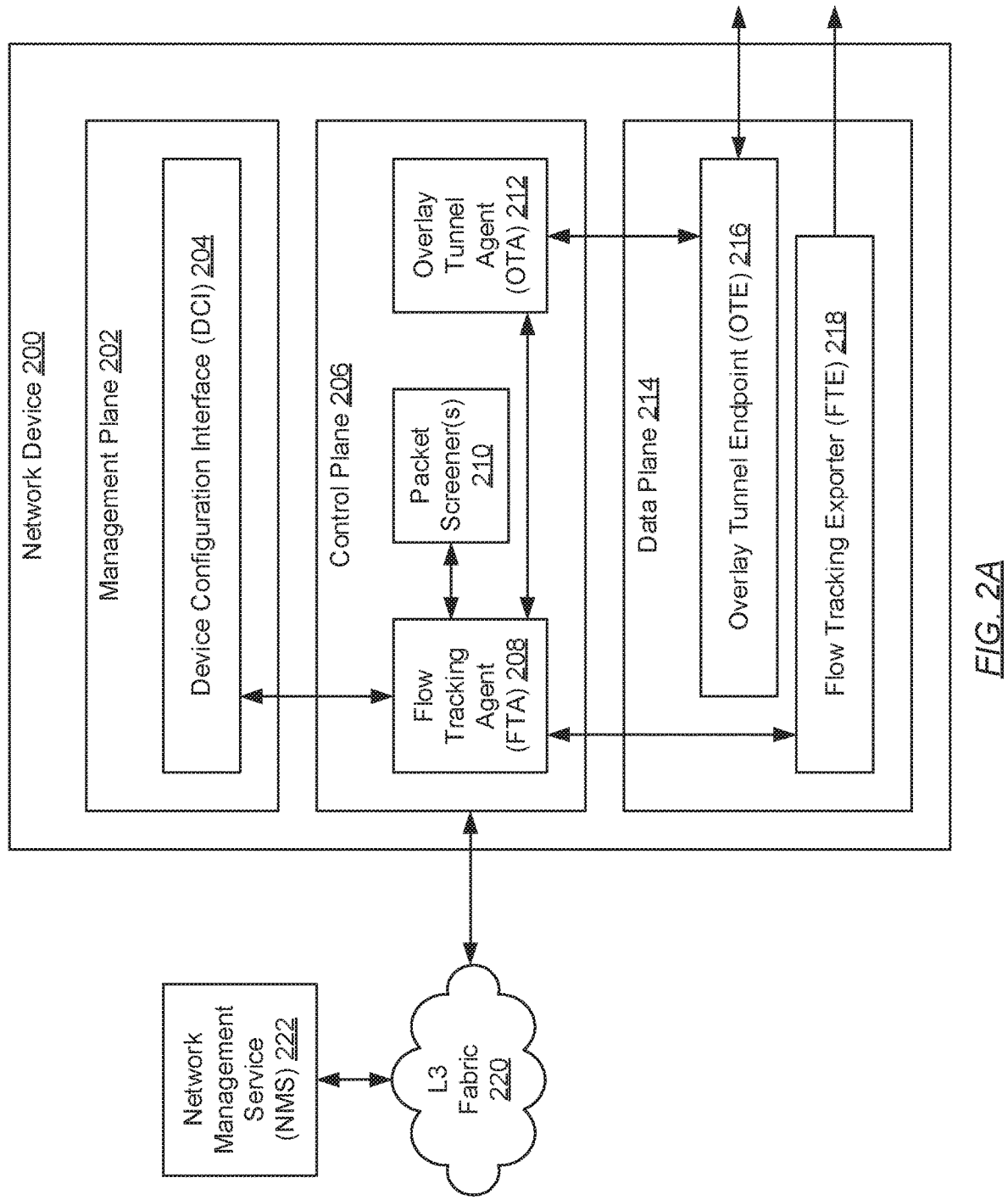
FIG. 2A shows a network device in accordance with one or more embodiments.

FIG. 2A shows a network device in accordance with one or more embodiments. The network device (200) may include a management plane (202), a control plane (206), and a data plane (214). The management plane (202) may represent a portion of the network device (200) architecture that may be responsible for configuring, controlling, and monitoring the network device (200), or more specifically, subcomponents of the control plane (206). Further, the control plane (206) may represent another portion of the network device (200) architecture that may be responsible for determining where to send network traffic. The determinations may rely, at least in part, on a dynamically changing network topology maintained by the control plane (206) through the sharing of routing (and/or other networking) protocol information amongst various network devices of the network. Moreover, the data plane (214) may represent yet another portion of the network device (200) architecture that may be responsible for receiving, parsing, processing, modifying, and transmitting network traffic. The data plane (214) may process and forward network traffic based on various data structures, policies, rules, and/or other information and instructions, which may be configured, managed, and updated by the control plane (206).

In one embodiment, the management plane (202) may include, but is not limited to, a device configuration interface (DCI) (204). The DCI (204) may refer to computer hardware and/or software through which a user (e.g., a network administrator) may interact with the network device (200). By way of examples, the DCI (204) may be implemented in the form of a command line interface (CLI), a graphical user interface (GUI), or any other interface design through which users may interact with the network device (200).

In one embodiment, the control plane (206) may support various agents and other processes, which include, but are not limited to, a flow tracking agent (FTA) (208), one or more packet screeners (210), and an overlay tunnel agent (OTA) (212). An agent may represent a computer program that may execute on the underlying hardware of the network device (200), which may implement and manage one or more roles for which the control plane (206) may be responsible.

To that extent, in one embodiment, the FTA (208) may represent a computer program tasked with the aggregation and exportation of flow tracking information descriptive of one or more network traffic flows, which may traverse the network device (200). The FTA (208) may also manage and configure a flow tracking exporter (FTE) (218) (described below). Furthermore, the FTA (208) may include functionality to substantively perform the various steps outlined and described below with respect to FIGS. 5A-5C, which includes communicating with the packet screener(s) (210) and the OTA (212). Moreover, the FTA (208) may be managed or configured by way of the DCI (204) or a network management service (NMS) (222) (described above), which may be operatively connected to the network device (200) through a L3 fabric (220).

In one embodiment, a packet screener (210) may represent a computer program tasked with the filtration of data packets, forming one or more network traffic flows, which traverse the network device (200). Each packet screener (210) may be configured to briefly analyze and/or process data packets, and determine whether the data packets warrant further inspection based on the aforementioned analyses and processing. By way of an example, a packet screener (210) may filter data packets in order to identify potential suspects of malicious intent—e.g., virus infected data packets. Accordingly, each packet screener (210) may include functionality to: receive metadata requests from the FTA (208); filter data packets in accordance with their configuration; and issue metadata responses back to the FTA (208), where the metadata responses may or may not include screener tag information (STI) (described below).

In one embodiment, the OTA (212) may represent a computer program tasked with the transmission and reception of overlay tunnel packets. An overly tunnel packet may refer to any layer-2 (L2) (e.g., media access control (MAC)) frame, in an encapsulated format, which may traverse the network using virtual overlay tunnels. The encapsulated format may follow any existing encapsulation scheme such as, for example, the virtual extensible local area network (VXLAN) protocol, the multi-protocol label switching (MPLS) protocol, the generic routing encapsulation (GRE) protocol, or any other encapsulation scheme employing virtual overlay tunnels to communicate overlay tunnel packets across networks. The OTA (212) may also manage and configure an overlay tunnel endpoint (OTE) (216) (described below). Subsequently, the OTA (212) may include functionality to: obtain L2 frames from and generated by the FTA (208); encapsulate (i.e., append overlay tunnel packet header information to) the L2 frames, to obtain overlay tunnel packets; decapsulate (i.e., remove overlay tunnel header information from) received overlay tunnel packets, to obtain received L2 frames; and provide the received L2 frames to other agents of the network device (200) for processing or any other action.

In one embodiment, the data plane (214) may include, but is not limited to, an overlay tunnel endpoint (OTE) (216). The OTE (216) may refer to hardware (e.g., at least a portion of a switch chip or network processor) that may be responsible for originating and/or terminating virtual overlay tunnels (e.g., network-spanning, logical tunnels implemented using an encapsulation scheme such as, for example, the VXLAN protocol, the MPLS protocol, the GRE protocol, or any other encapsulation scheme). To that extent, the OTE (216) may include functionality to: transmit overlay tunnel packets (described above) towards remote OTEs (not shown) residing on remote network devices (not shown) through the L3 fabric (220); and receive other overlay tunnel packets from these remote OTEs through the L3 fabric (220). By way of an example, an overlay tunnel packet may take form as a VXLAN frame, whereas the virtual overlay tunnel through which VXLAN frames traverse may be representative of a VXLAN tunnel, and the OTE (216) wherefrom the VXLAN frames depart and/or whereat other VXLAN frames arrive may exist as a virtual tunnel end point (VTEP). Embodiments are not limited to any specific implementation or protocol for generating overlay tunnel packets and/or virtual overlay tunnels.

In one embodiment, the data plane (214) may further include a flow tracking exporter (FTE) (218). The FTE (218) may refer to hardware (e.g., at least a portion of a switch chip or network processor) that may be responsible for routing and/or bridging flow tracking information, towards one or more flow collectors, in accordance with an employed traffic analysis protocol. A traffic analysis protocol may pertain to any network communication protocol directed to the exportation of network traffic flow pertinent information from a network device to a flow collector. An example of a traffic analysis protocol may be, but is not limited to, the Internet protocol flow information export (IPFIX) protocol. In one embodiment, the FTE (218) may include functionality to transmit messages (see e.g., FIG. 4A) (described below), generated by the FTA (208), across the L3 fabric (220) and towards one or more flow collectors.

While FIG. 2A shows a configuration of components, other network device configurations may be used without departing from the scope of the technology.

Figure 2B:
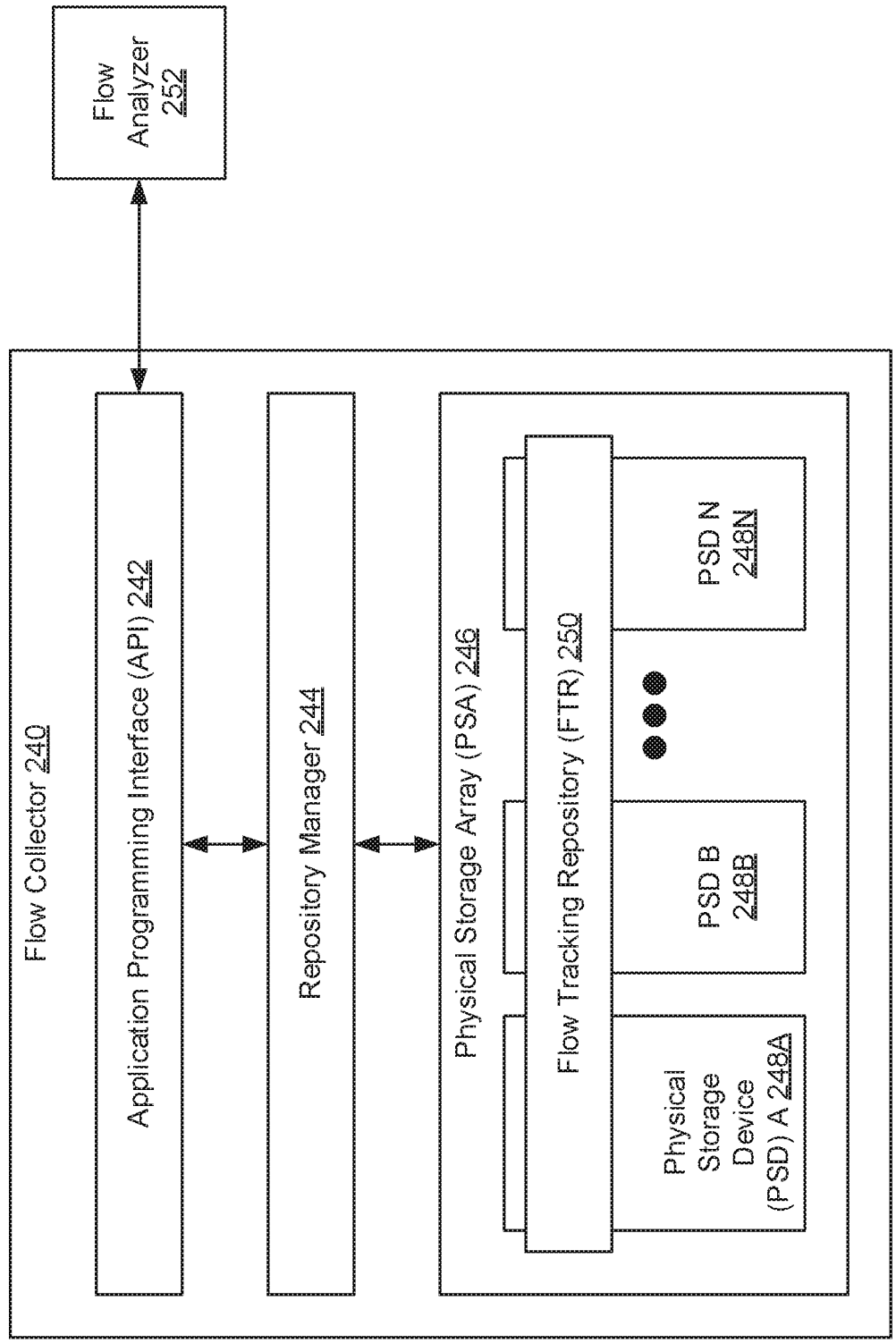
FIG. 2B shows a flow collector in accordance with one or more embodiments.

FIG. 2B shows a flow collector in accordance with one or more embodiments. The flow collector (240) may include, but is not limited to, an application programming interface (API) (242), a repository manager (244), and a physical storage array (PSA) (246). Each of these components is described below.

In one embodiment, the API (242) may represent a hardware and/or software implemented construct that employs a set of subroutine definitions, protocols, and/or tools for enabling interactions between the flow collector (240) and one or more external entities (e.g., a flow analyzer (252), a network device (not shown), etc.). The API (242) may include functionality to: receive exported flow tracking information originating from one or more network devices; relay the exported flow tracking information to the repository manager (244) for processing and consolidation; receive information queries from the flow analyzer (252); relay the information queries to the repository manager (244) for processing; receive query responses from the repository manager (244); and transmit the query responses to the flow analyzer (252). One of ordinary skill will appreciate that the API (242) may perform other functionalities without departing from the scope of the technology.

In one embodiment, the repository manager (244) may represent a computer program that executes on the underlying hardware of the flow collector (240). Further, the repository manager (244) may be responsible for the management of flow tracking information on the flow collector (240). To that extent, the repository manager (244) may include functionality to: obtain exported flow tracking information from the API (242); process and consolidate the exported flow tracking information within the flow tracking repository (FTR) (250) (described below); obtain information queries from the API (242); identify and retrieve flow tracking information from the FTR (250) based on parameters specified in the information queries; and provide information responses, including the identified flow tracking information, to the API (242). One of ordinary skill will appreciate that the repository manager (244) may perform other functionalities without departing from the scope of the technology.

In one embodiment, the PSA (246) may represent a collection of one or more physical storage devices (PSD) (248A-248N) on which various forms of information—e.g., flow tracking information—may be consolidated. In turn, each PSD (248A-248N) may encompass non-transitory computer readable storage media (e.g., optical disk(s), tape(s), magnetic disk(s), etc.) on which the various forms of information may be stored in whole or in part, and temporarily or permanently. Examples of a PSD (248A-248N) may include, but are not limited to, a hard disk drive (HDD), a solid state drive (SSD), and network attached storage (NAS). Further, in one embodiment, each PSD (248A-248N) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment, a flow tracking repository (FTR) (250) may be implemented on, and may span across, at least a subset of the PSDs (248A-248N) of the PSA (246). The FTR (250) may represent data storage wherein flow tracking information, exported from one or more network devices (not shown), may be consolidated. Further, the aforementioned flow tracking information may be arranged by way of any storage mechanism (e.g., a filesystem, a collection of tables or records, etc.). The FTR (250) is described in further detail below with respect to FIG. 3A.

While FIG. 2B shows a configuration of components, other flow collector configurations may be used without departing from the scope of the technology.

Figure 3A:
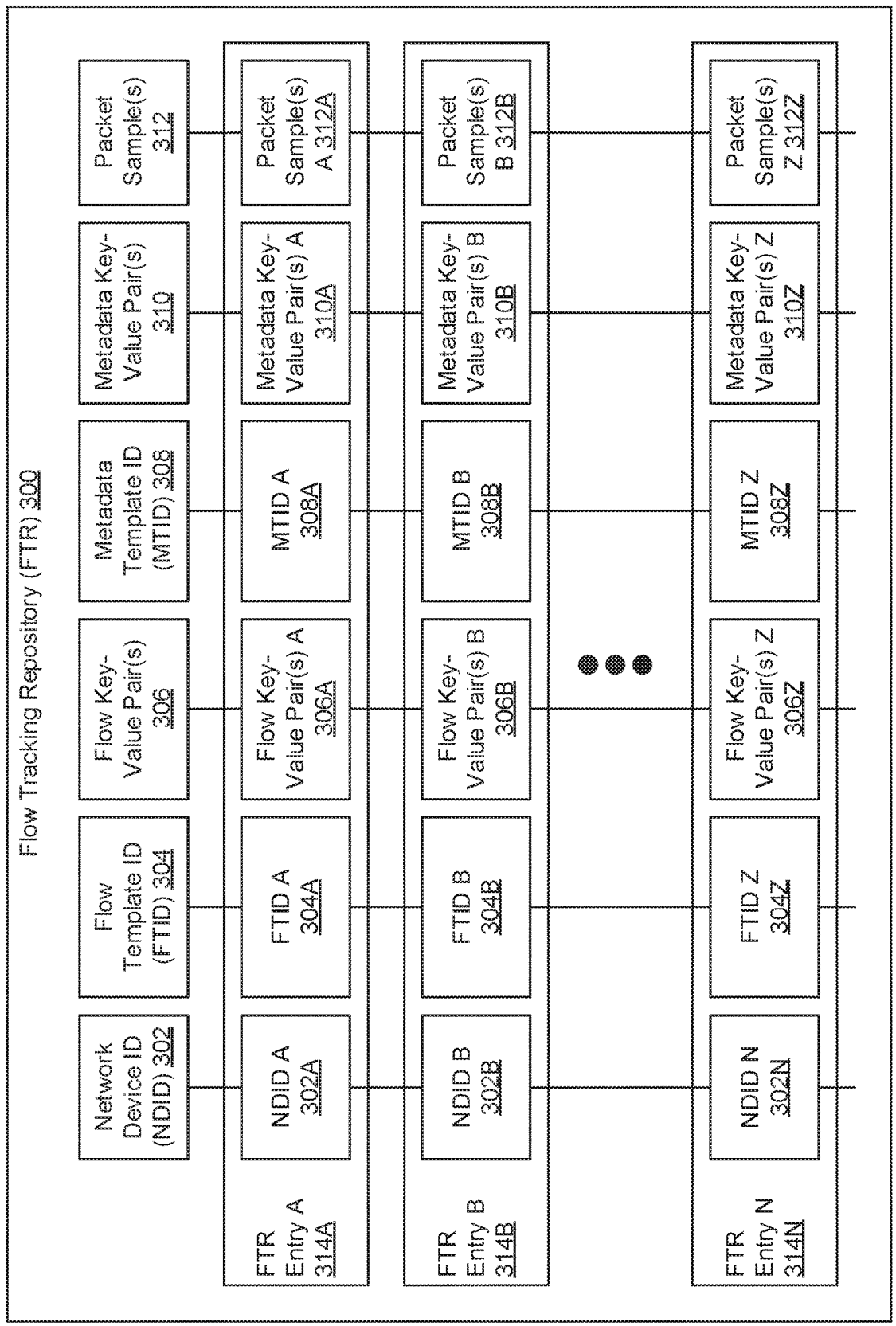
FIG. 3A shows a flow tracking repository in accordance with one or more embodiments.

FIG. 3A shows a flow tracking repository (FTR) in accordance with one or more embodiments. The FTR (300) may represent data storage wherein flow tracking information, exported from one or more network devices, may be consolidated on a flow collector. Flow tracking information may refer to statistical, infrastructure, routing, and/or other information descriptive of traffic flows communicated between endpoints (e.g., a source host and a destination host) of a network. Furthermore, the FTR (300) may index the flow tracking information stored therein, for example, by way of one or more FTR entries (314A-314N).

In one embodiment, each FTR entry (314A-314N) may pertain to a unique network traffic flow—i.e., a unique sequence of one or more data packets communicated from a source host to a destination host. Accordingly, each FTR entry (314A-314N) may specify the following flow tracking information, descriptive of a unique network traffic flow: a network device identifier (ID) (NDID) (302), a flow template ID (FTID) (304), one or more flow key-value pairs (306), a metadata template ID (MTID) (308), zero or more metadata key-value pairs (310), and one or more packet samples (312). Each of these pieces of information is described below.

In one embodiment, the NDID (302) may refer to an arbitrary-length character string that may serve to uniquely identify a given network device. With respect to the flow tracking information specified in a given FTR entry (314A-314N), the NDID (302) identifies from which network device the flow tracking information had been exported. Examples of the NDID (302) may include, but are not limited to, a media access control (MAC) address associated with a given network device, an Internet Protocol (IP) address associated with the given network device, a network- or user-defined identifier assigned to the given network device, or any other arbitrary-length character string that may uniquely identify the given network device.

Figure 4A:
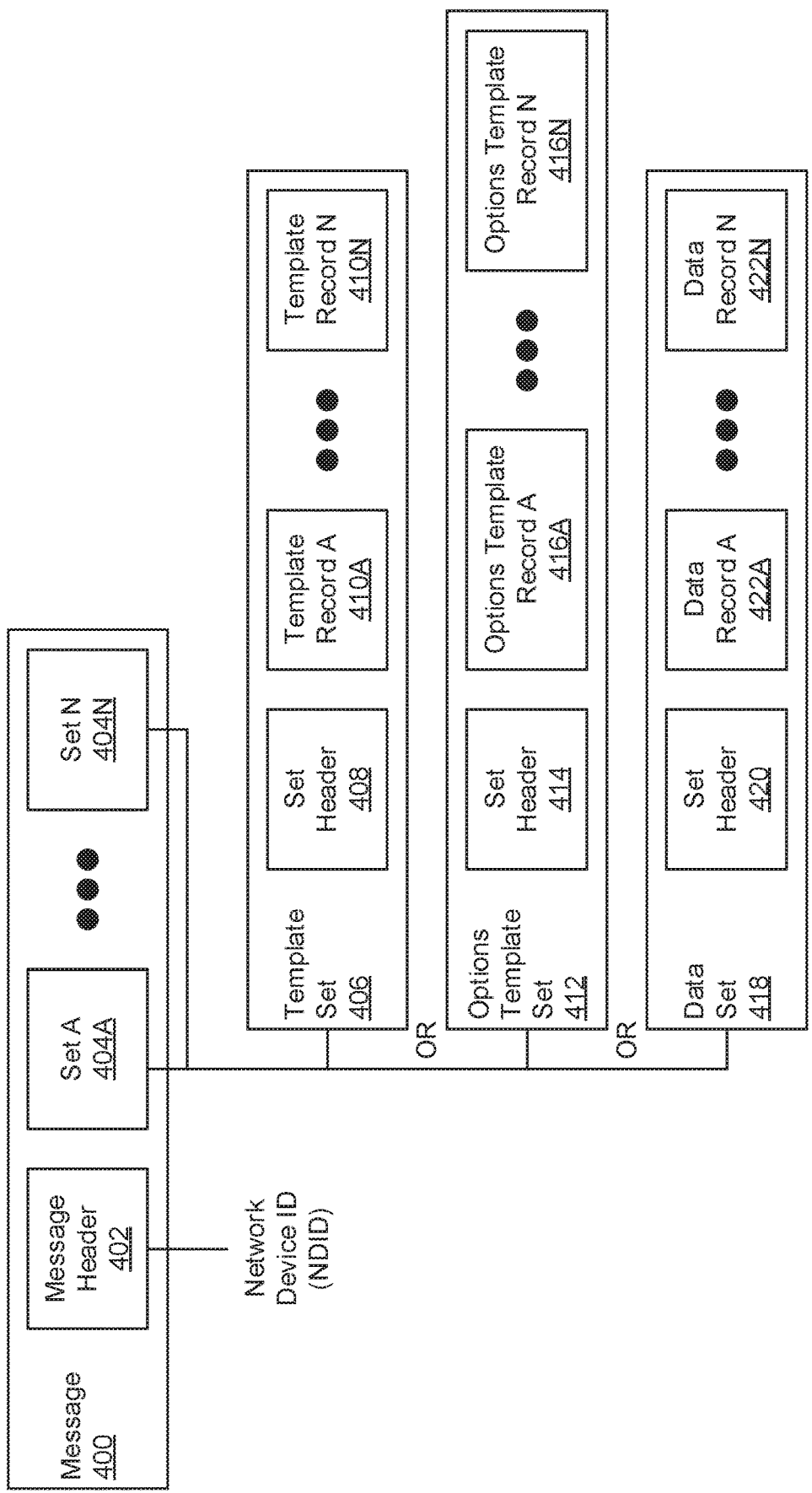
FIG. 4A shows a message in accordance with one or more embodiments.
Figure 4B:
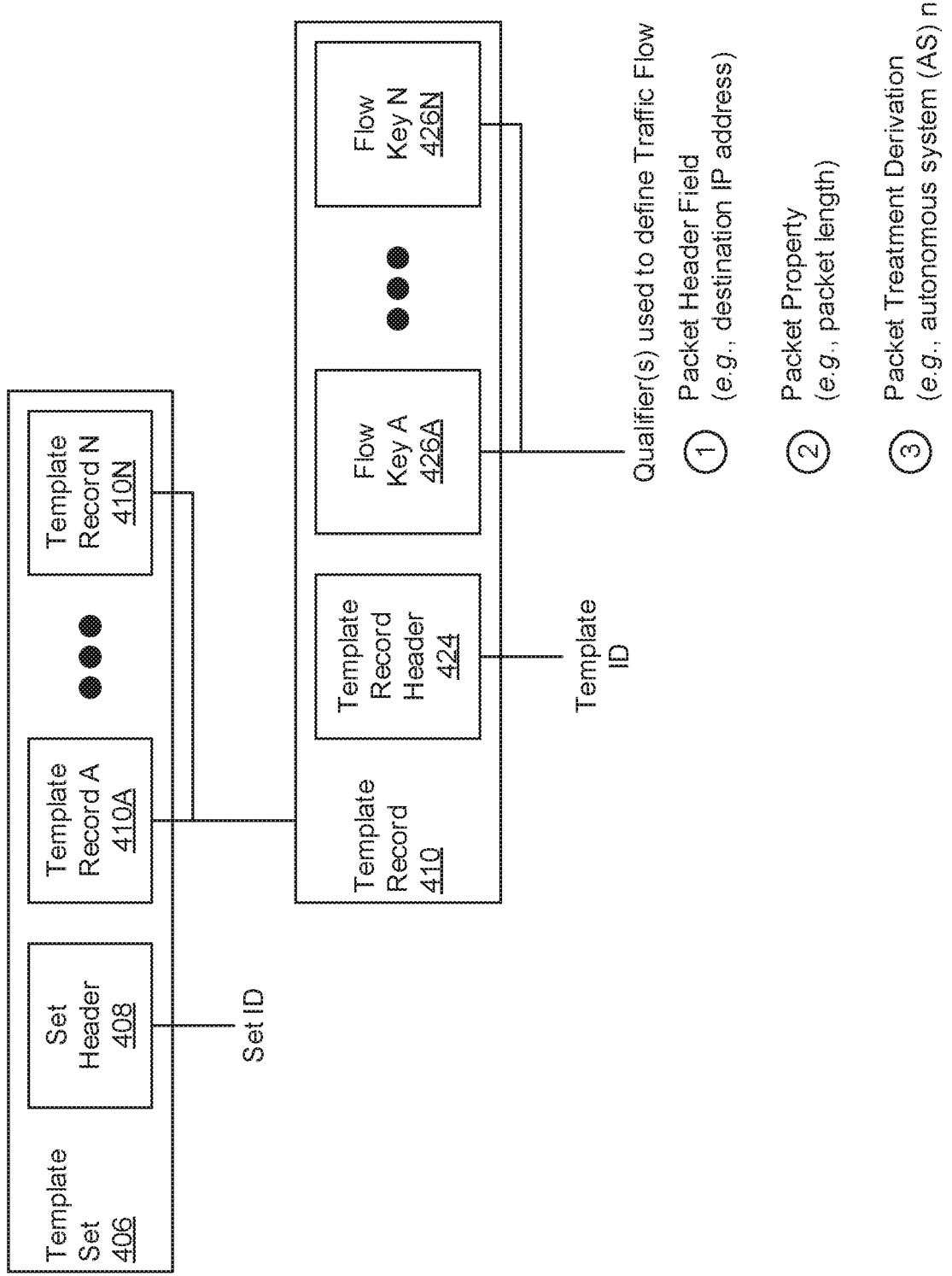
FIG. 4B shows a template set in accordance with one or more embodiments.

In one embodiment, the FTID (304) may refer to a fixed-length numerical value (e.g., a decimal number, a hexadecimal number, an octal number, a binary number, etc.) that serves to uniquely identify a template record (see e.g., FIG. 4B). A template record may represent logical packaging that encompasses at least one or more flow keys, where a flow key may refer to a name or label associated with a property (or attribute) that may be used to define a network traffic flow. Examples of a flow key include, but are not limited to, labels for data packet header information fields (e.g., "Source IP Address", "Destination IP Address", "Source Port", "Destination Port", "VLAN ID", etc.), labels for data packet and/or network traffic flow metadata (e.g., "Packet Length", "Packet Count", etc.), labels for data packet treatment information (e.g., "IP Next-Hop IPv4 Address", "BGP Destination ASN", etc.), and labels for miscellaneous information pertinent to a network traffic flow (e.g., "Ingress Port", "Egress Port", "Protocol", "Flow Start Timestamp", "Flow End Timestamp", "Multicast Flag", "VRF Name", etc.).

In one embodiment, each flow key-value pair (306) may represent a data tuple that associates a flow key (i.e., a name or label associated with a property or attribute for defining a network traffic flow) to a respective flow value. A flow value may refer to the actual content or data corresponding to the property (or attribute), labeled by the flow key, which characterizes the network traffic flow. Examples of a flow value include, but are not limited to, content/data for data packet header information fields (e.g., 1.1.1.1, which may correspond to the flow key "Source IP Address" and thus may disclose the source IP address from which the network traffic flow originated), content/data for network traffic flow metadata (e.g., 4, which may correspond to the flow key "Packet Length" and thus may disclose the measured packet length, in octets, of each data packet in the network traffic flow), content/data for data packet treatment information (e.g., 42711, which may correspond to the flow key "BGP Destination ASN" and thus may disclose the autonomous system number (ASN) used in the border gateway protocol (BGP) to uniquely identify a network or subnet of the Internet through which the network traffic flow may be traversing), and content/data for miscellaneous information pertinent to a network traffic flow (e.g., 8080, which may correspond to the flow key "Egress Port" and thus may disclose the outgoing network interface of the exporting network device through which the network traffic flow had been sent out from in order to continue along a path towards its final destination).

Figure 4C:
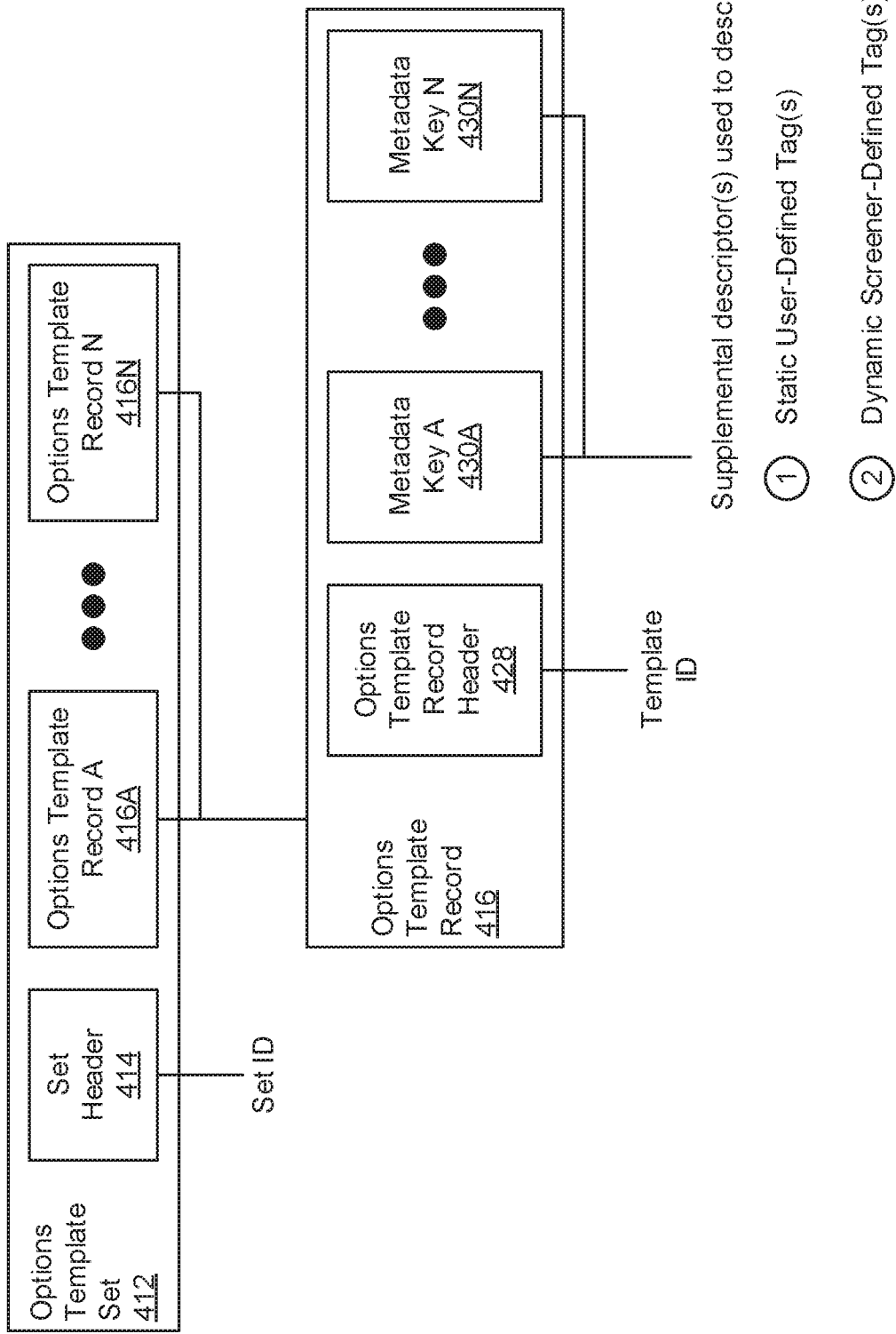
FIG. 4C shows an options template set in accordance with one or more embodiments.

In one embodiment, the MTID (308) may refer to a fixed-length numerical value (e.g., a decimal number, a hexadecimal number, an octal number, a binary number, etc.) that serves to uniquely identify an options template record (see e.g., FIG. 4C). An options template record may represent logical packaging that encompasses at least one or more metadata keys, where a metadata key may refer to: a name or label associated with metadata that may be used to describe the exporter; a name or label associated with metadata that may be used to describe the exporting process; and/or a name or label associated with metadata descriptive of a network traffic flow. Examples of a metadata key include, but are not limited to, labels for network device (or exporter) information (e.g., "Exporter IP Address", "Exporter MAC Address", "Exporter ID", etc.), labels for exportation process metadata (e.g., "Total Exported Message Count", "Total Exported Template Record Count", "Total Exported Options Template Record Count", "Total Exported Data Record Count", etc.), and labels for supplemental network traffic flow metadata (e.g., "Customer", "Traffic Type", "Traffic Purpose", "Packet Filter", etc.).

In one embodiment, each metadata key-value pair (310), if any, may represent a data tuple that associates a metadata key (i.e., a name or label associated with metadata descriptive of an exporter, an exporting process, or a network traffic flow) to a respective metadata value. A metadata value may refer to content or data corresponding to the metadata, labeled by the metadata key, which describes the exporter, exporting process, or network traffic flow. Examples of a metadata value include, but are not limited to, content/data directed to network device (or exporter) information (e.g., 199.221.66.10, which may correspond to the metadata key "Exporter IP Address" and thus may disclose the IP address associated with the network device exporting the flow tracking information), content/data directed to exportation process metadata (e.g., 3, which may correspond to the metadata key "Total Exported Message Count" and thus may disclose that the exported flow tracking information consists of three messages (see e.g., FIG. 4A)), and content/data directed to supplemental network traffic flow metadata (e.g., "Corporation1", which may correspond to the metadata key "Customer" and thus may disclose the customer name with which the network traffic flow is associated).

In one embodiment, a packet sample (312) may refer to an exact copy or replication of a data packet, which may be representative of a network traffic flow. The packet sample (312) may disclose other information regarding the network traffic flow, which may not be expressed through the NDID (302), the FTID (304), the flow key-value pair(s) (306), the MTID (308), and the metadata key-value pair(s) (310). For example, the packet sample (312) may include a data packet payload, which may be pertinent to any analysis of the network traffic flow performed by a flow analyzer.

Figure 3B:
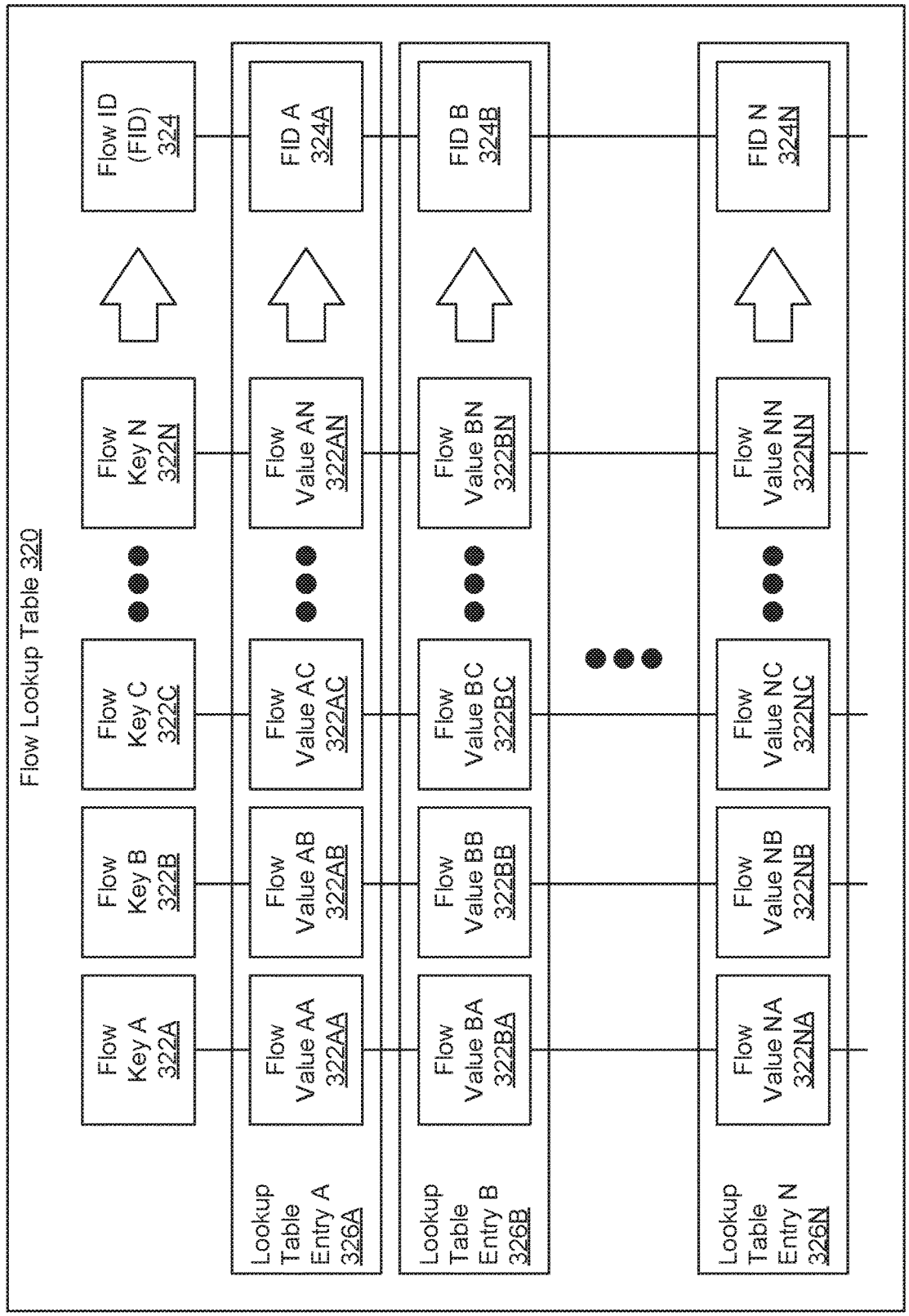
FIG. 3B shows a flow lookup table in accordance with one or more embodiments.

FIG. 3B shows a flow lookup table in accordance with one or more embodiments. The flow lookup table (320) may represent a data structure wherein network traffic flows, sought to be tracked, may be defined. The aforementioned data structure may be implemented, for example, using ternary content addressable memory (TCAM). Furthermore, the flow lookup table (320) may index network traffic flows defined therein, for example, by way of one or more lookup table entries (326A-326N). Each lookup table entry (326A-326N) may specify the following network traffic flow defining information: one or more flow values (e.g., 322AA-322AN) corresponding to one or more flow keys (322A-322N), respectively, and a flow identifier (FID) (324). Each of these pieces of information is described below.

In one embodiment, a flow key (322A-322N) may refer to a name or label associated with a property (or attribute) that may be used to define a network traffic flow. Examples of a flow key (322A-322N) may include, but are not limited to, labels for data packet header information fields (e.g., "Source IP Address", "Destination IP Address", "Source Port", "Destination Port", "VLAN ID", etc.), labels for data packet and/or network traffic flow metadata (e.g., "Packet Length", "Packet Count", etc.), labels for data packet treatment information (e.g., "IP Next-Hop IPv4 Address", "BGP Destination ASN", etc.), and labels for miscellaneous information pertinent to a network traffic flow (e.g., "Ingress Port", "Egress Port", "Protocol", "Flow Start Timestamp", "Flow End Timestamp", "Multicast Flag", "VRF Name", etc.).

In one embodiment, a flow value (e.g., 322AA-322AN) may refer to the actual content or data corresponding to the property (or attribute), labeled by the flow key (322A-322N), which characterizes the network traffic flow associated with the lookup table entry (326A-326N). Examples of a flow value (e.g., 322AA-322AN) include, but are not limited to, content/data for data packet header information fields (e.g., 1.1.1.1, which may correspond to the flow key "Source IP Address" and thus may disclose the source IP address from which the network traffic flow originated), content/data for network traffic flow metadata (e.g., 4, which may correspond to the flow key "Packet Length" and thus may disclose the measured packet length, in octets, of each data packet in the network traffic flow), content/data for data packet treatment information (e.g., 42711, which may correspond to the flow key "BGP Destination ASN" and thus may disclose the autonomous system number (ASN) used in the border gateway protocol (BGP) to uniquely identify a network or subnet of the Internet through which the network traffic flow may be traversing), and content/data for miscellaneous information pertinent to a network traffic flow (e.g., 8080, which may correspond to the flow key "Egress Port" and thus may disclose the outgoing network interface of the exporting network device through which the network traffic flow had been sent out from in order to continue along a path towards its final destination).

In one embodiment, the FID (324) may represent an arbitrary-length character string that may serve to uniquely identify a sought-to-be-tracked network traffic flow. The aforementioned sought-to-be-tracked network traffic flow may be associated with the lookup table entry (one of 326A-326N) within which the FID (324) may be specified. Further, the aforementioned sought-to-be-tracked network traffic flow may be defined through the flow value(s) (e.g., 322AA-322AN), corresponding to the flow key(s) (322A-322N), specified in the lookup table entry (326A-326N). Moreover, in one embodiment, the FID (324) may serve as an index that uniquely identifies a corresponding information table entry in a flow information table (see e.g., FIG. 3C).

Figure 3C:
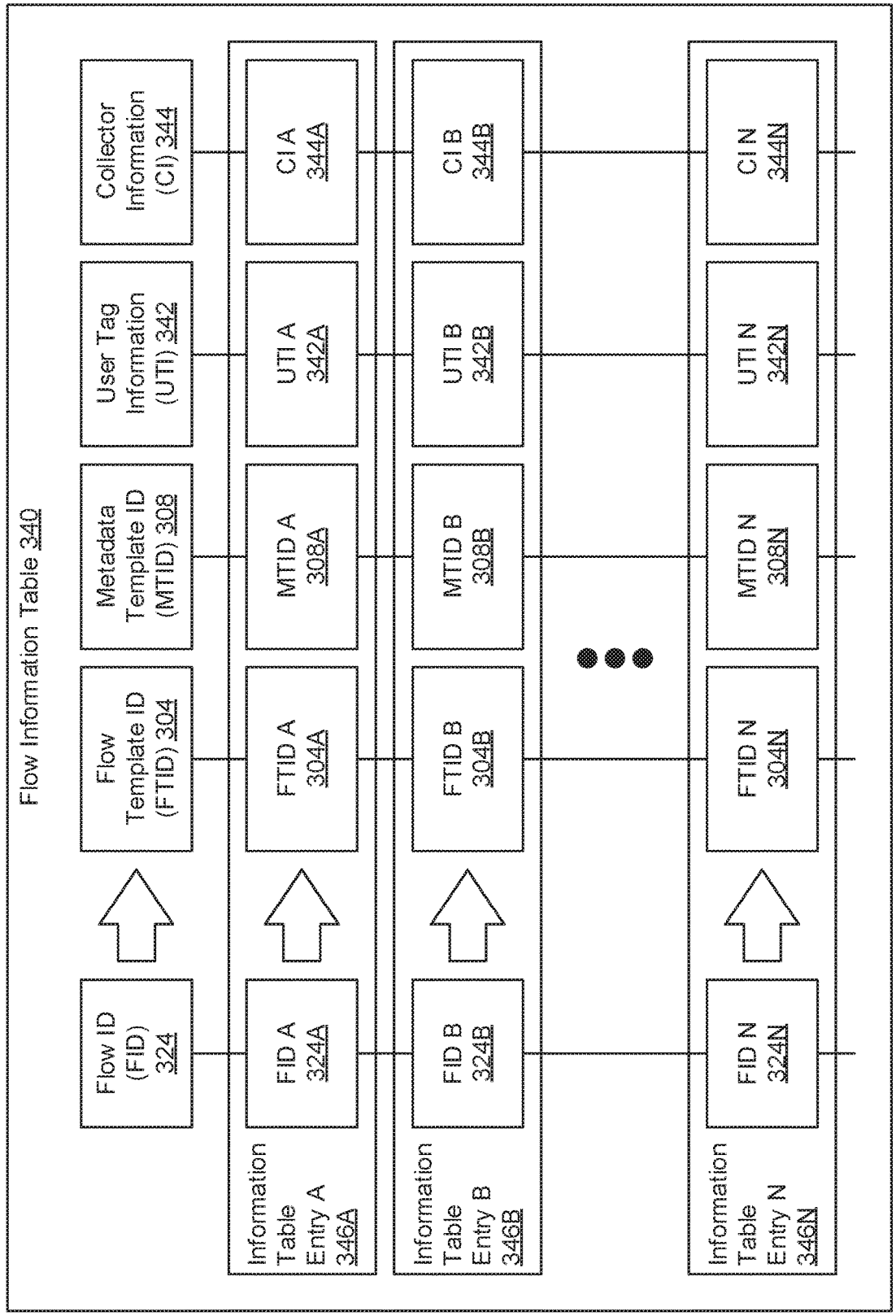
FIG. 3C shows a flow information table in accordance with one or more embodiments.

FIG. 3C shows a flow information table in accordance with one or more embodiments. The flow information table (340) may represent a data structure wherein export details associated with network traffic flows, sought to be tracked, may be disclosed. Accordingly, the flow information table (340) may index network traffic flow export details disclosed therein, for example, by way of one or more information table entries (346A-346N). Further, each information table entry (346A-346N) may specify the following export details pertaining to a given network traffic flow sought for tracking: a flow identifier (FID) (324), a flow template ID (FTID) (304), a metadata template ID (MTID) (308), user tag information (UTI) (342), and collector information (CI) (344). Each of these pieces of information is described below.

In one embodiment, the FID (324) may represent an arbitrary-length character string that may serve to uniquely identify a sought-to-be-tracked network traffic flow. The aforementioned sought-to-be-tracked network traffic flow may be associated with the information table entry (346A-346N) within which the FID (324) may be specified. Further, the FID (324) may serve to map the information table entry (346A-346N) to a corresponding lookup table entry in a flow lookup table (see e.g., FIG. 3B).

In one embodiment, the FTID (304) may refer to a fixed-length numerical value (e.g., a decimal number, a hexadecimal number, an octal number, a binary number, etc.) that serves to uniquely identify a template record (see e.g., FIG. 4B). The template record may specify a set of flow keys (i.e., names or labels associated with a property or attribute for defining a network traffic flow) that may be used to specifically define the sought-to-be-tracked network traffic flow associated with the information table entry (346A-346N).

In one embodiment, the MTID (308) may refer to a fixed-length numerical value (e.g., a decimal number, a hexadecimal number, an octal number, a binary number, etc.) that serves to uniquely identify an options template record (see e.g., FIG. 4C). The options template record may specify a set of metadata keys (i.e., names or labels associated with metadata descriptive of an exporter, an exporting process, or a network traffic flow) that may be used to further describe the exporting network device of the sought-to-be-tracked network traffic flow, the process involved in the exportation of the sought-to-be-tracked network traffic flow, and/or the sought-to-be-tracked network traffic flow itself associated with the information table entry (346A-346N).

In one embodiment, UTI (342) may refer to user-defined metadata descriptive of the sought-to-be-tracked network traffic flow associated with the information table entry (346A-346N). The UTI (342) may take form as one or more user-defined metadata key-value pairs. Specifically, each user-defined metadata key-value pair may represent a data tuple that associates a user-defined metadata key to a user-defined metadata value. A user-defined metadata key may refer to a name or label for some information (e.g., a tag) that a network administrator wishes to associate with the sought-to-be-tracked network traffic flow. Examples of a user-defined metadata key may include, but are not limited to, labels identifying an entity associated with the sought-to-be-tracked network traffic flow (e.g., "Customer"), labels identifying a classification associated with the sought-to-be-tracked network traffic flow (e.g., "Traffic Type"), and labels defining the utility associated with the sought-to-be-tracked network traffic flow (e.g., "Traffic Purpose").

In one embodiment, a user-defined metadata value, on the other hand, may refer to content or data, corresponding to a respective user-defined metadata key, which the network administrator applies and associates with the sought-to-be-tracked network traffic flow. Following the aforementioned, exemplified user-defined metadata keys, examples of a user-defined metadata value may include, but are not limited to, content/data directed to identifying the entity with which the sought-to-be-tracked network traffic flow is associated (e.g., "Corporation1", which may correspond to the user-defined metadata key "Customer" and thus may disclose that the sought-to-be-tracked network traffic flow belongs to Corporation1), content/data directed to identifying the classification with which the sought-to-be-tracked network traffic flow is associated (e.g., "Guest", which may correspond to the user-defined metadata key "Traffic Type" and thus may disclose that the sought-to-be-tracked network traffic flow pertains to guest-associated network traffic), and content/data directed to defining the utility of the sought-to-be-tracked network traffic flow (e.g., "Traffic between Virtual Machines", which may correspond to the user-defined metadata key "Traffic Purpose" and thus may disclose that the sought-to-be-tracked network traffic flow is representative of network traffic exchanged between virtual machines).

In one embodiment, CI (344) may refer to forwarding information and/or metadata pertinent to a given flow collector. The given flow collector may have been assigned, by network administrators, to collect and consolidate flow tracking information for the sought-to-be-tracked network traffic flow associated with the information table entry (346A-346N). Further, forwarding information may entail data link layer (L2), network layer (L3), transport layer (L4), and/or other information that may be used for network traffic to reach the given flow collector. Examples of forwarding information may include, but are not limited to, the Internet Protocol (IP) address for the given flow collector, the media access control (MAC) address for the given flow collector, the ingress port of the given flow collector designated to receive the flow tracking information, the virtual local area network (VLAN) identifier (ID) associated with the VLAN of which the given flow collector is a member, and overlay tunnel domain (e.g., VXLAN domain and/or VTEP IP address) information associated with the network device that may be directly-connected to the given flow collector. On the other hand, flow collector metadata may entail information descriptive of the given flow collector. Examples of metadata may include, but are not limited to, a flow collector identifier that may serve to uniquely identify the given flow collector, a repository size that may indicate the total storage space characterizing the flow tracking repository (FTR) (see e.g., FIG. 2B) residing on the given flow collector, etc.

FIG. 4A shows a message in accordance with one or more embodiments. The message (400) may represent a formatted collection of flow tracking information, which may be exported (or transmitted) to one or more flow collectors (see e.g., FIG. 1). The message (400) may be interpreted, by the flow collector(s), based on an employed traffic analysis protocol—e.g., the Internet Protocol Flow Information Export (IPFIX) protocol. Furthermore, the message (400) may include, but is not limited to, a message header (402) and zero or more sets (404A-404N). Each of these components is described below.

In one embodiment, the message header (402) may refer to a collection of basic information descriptive of the message (400). The aforementioned basic information, disclosed by the message header (402), may include, but is not limited to: a version number associated with the version of the traffic analysis protocol to which the message (400) conforms; a length measuring the number of octets spanning the message (400); an export timestamp encoding the date and/or time at which the message (400) had been transmitted by the network device (i.e., flow tracking information exporter); and a network device identifier (NDID) associated with the aforementioned network device.

In one embodiment, a set (one of 404A-404N), if any are included, may represent a collection of records that may be similarly structured. Each set (404A-404N) included in the message (400) may be a template set (406), an options template set (412), or a data set (418). These different sets are described in further detail below with respect to FIGS. 4B-4D, respectively.

FIG. 4B shows a template set in accordance with one or more embodiments. The template set (406) may substantively refer to a collection of one or more template records (410A-410N), which have been grouped together to, at least in part, embody a message (400) (see e.g., FIG. 4A); and may further include a set header (408). Each of these components is described below.

In one embodiment, the set header (408) may refer to a collection of basic information descriptive of the template set (406). The aforementioned basic information, disclosed by the set header (408), may include, but is not limited to: a set identifier (ID) that may serve to uniquely identify the template set (406); and a length measuring the number of octets spanning the template set (406).

In one embodiment, a template record (410A-410N) may substantively refer to a collection of one or more flow keys (426A-426N), which may serve to define a given sought-to-be-tracked network traffic flow; and may further include a template record header (424). Each of these components is described below.

In one embodiment, the template record header (424) may refer to a collection of basic information descriptive of the template record (410). The aforementioned basic information, disclosed by the template record header (424), may include, but is not limited to: a template ID that may serve to uniquely identify the template record (410); and a key count enumerating the number of flow keys (426A-426N) specified in the template record (410).

In one embodiment, a flow key (426A-426N) may refer to a name or label associated with a property (or attribute) that may be used to define a network traffic flow. Examples of a flow key (426A-426N) may include, but are not limited to, labels for data packet header information fields (e.g., "Source IP Address", "Destination IP Address", "Source Port", "Destination Port", "VLAN ID", etc.), labels for data packet and/or network traffic flow metadata (e.g., "Packet Length", "Packet Count", etc.), labels for data packet treatment information (e.g., "IP Next-Hop IPv4 Address", "BGP Destination ASN", etc.), and labels for miscellaneous information pertinent to a network traffic flow (e.g., "Ingress Port", "Egress Port", "Protocol", "Flow Start Timestamp", "Flow End Timestamp", "Multicast Flag", "VRF Name", etc.).

FIG. 4C shows an options template set in accordance with one or more embodiments. The options template set (412) may substantively refer to a collection of one or more options template records (416A-416N), which have been grouped together to, at least in part, embody a message (400) (see e.g., FIG. 4A); and may further include a set header (414). Each of these components is described below.

In one embodiment, the set header (414) may refer to a collection of basic information descriptive of the options template set (412). The aforementioned basic information, disclosed by the set header (414), may include, but is not limited to: a set identifier (ID) that may serve to uniquely identify the options template set (412); and a length measuring the number of octets spanning the options template set (412).

In one embodiment, an options template record (416) may substantively refer to a collection of one or more metadata keys (430A-430N), which may serve to describe an exporter of flow tracking information, the process entailing the exportation of flow tracking information, or supplemental metadata associated with a given sought-to-be-tracked network traffic flow; and may further include an options template record header (428). Each of these components is described below.

In one embodiment, the options template record header (428) may refer to a collection of basic information descriptive of the options template record (416). The aforementioned basic information, disclosed by the options template record header (428), may include, but is not limited to: a template ID that may serve to uniquely identify the options template record (416); and a key count enumerating the number of metadata keys (430A-430N) specified in the options template record (416).

In one embodiment, a metadata key (430A-430N) may refer to: a name or label associated with metadata that may be used to describe an exporter (i.e., network device) of the flow tracking information; a name or label associated with metadata that may be used to describe the exporting process; and/or a name or label associated with metadata descriptive of a network traffic flow. Examples of a metadata key (430A-430N) may include, but are not limited to, labels for network device (or exporter) information (e.g., "Exporter IP Address", "Exporter MAC Address", "Exporter ID", etc.), labels for exportation process metadata (e.g., "Total Exported Message Count", "Total Exported Template Record Count", "Total Exported Options Template Record Count", "Total Exported Data Record Count", etc.), and labels for supplemental network traffic flow metadata (e.g., "Customer", "Traffic Type", "Traffic Purpose", "Packet Filter", etc.).

Figure 4D:
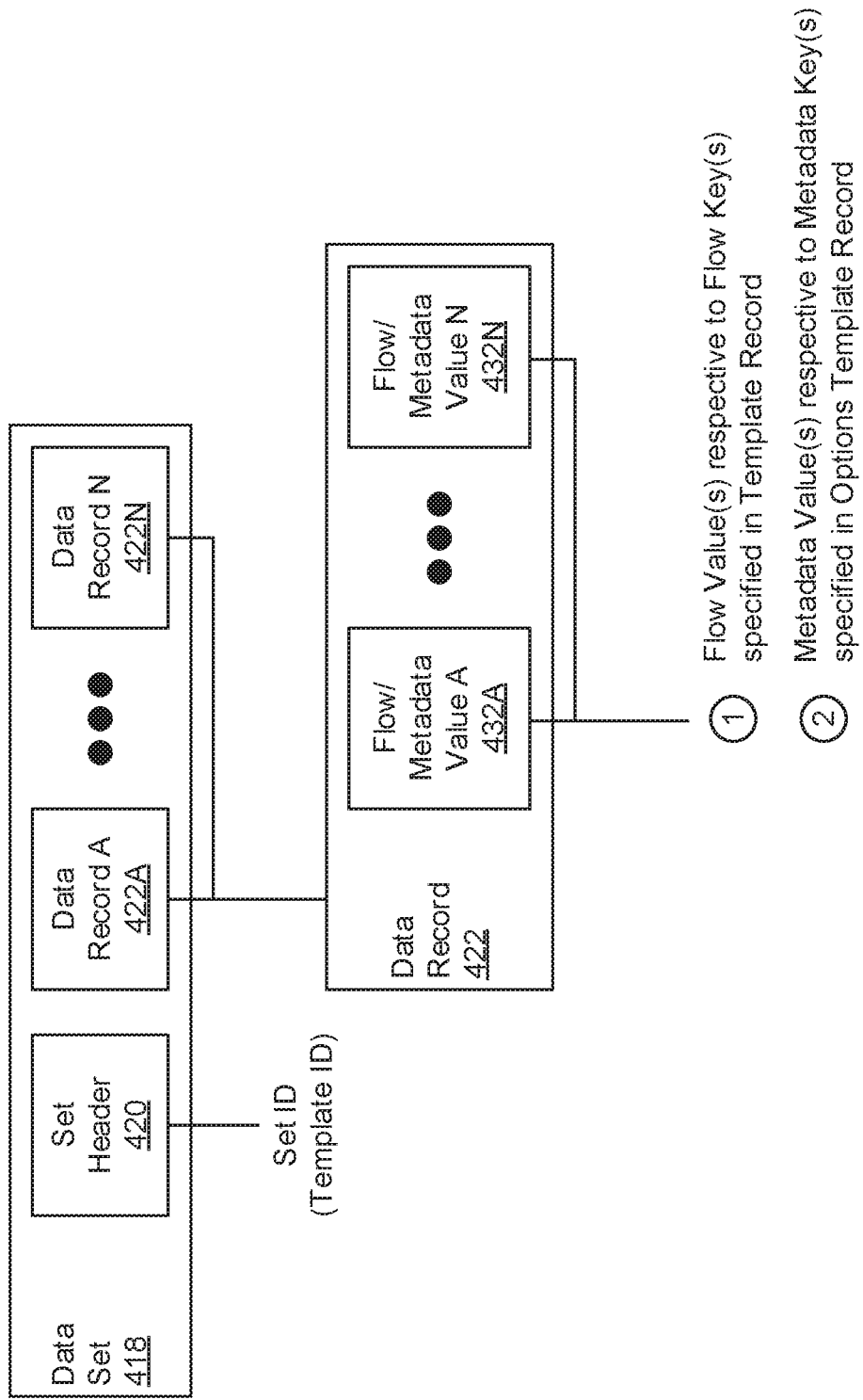
FIG. 4D shows a data set in accordance with one or more embodiments.

FIG. 4D shows a data set in accordance with one or more embodiments. The data set (418) may substantively refer to a collection of one or more data records (422A-422N), which have been grouped together to, at least in part, embody a message (400) (see e.g., FIG. 4A); and may further include a set header (420). Each of these components is described below.

In one embodiment, the set header (420) may refer to a collection of basic information descriptive of the data set (418). The aforementioned basic information, disclosed by the set header (420), may include, but is not limited to: a set identifier (ID) usually populated with the unique template ID associated with a previously defined template record (410) (see e.g., FIG. 4B) or options template record (416) (see e.g., FIG. 4C); and a length measuring the number of octets spanning the data set (418).

In one embodiment, a data record (422) may refer to a collection of one or more flow values (432A-432N), which may correspond to one or more flow keys (426A-426N), respectively, included in the template record (410) (see e.g., FIG. 4B) associated with the template ID specified as the data set (418) set ID. A flow value (432A-432N) may refer to the actual content or data corresponding to the property (or attribute), labeled by the flow key (426A-426N), which characterizes the network traffic flow. Examples of a flow value (432A-432N) include, but are not limited to, content/data for data packet header information fields (e.g., 1.1.1.1, which may correspond to the flow key "Source IP Address" and thus may disclose the source IP address from which the network traffic flow originated), content/data for network traffic flow metadata (e.g., 4, which may correspond to the flow key "Packet Length" and thus may disclose the measured packet length, in octets, of each data packet in the network traffic flow), content/data for data packet treatment information (e.g., 42711, which may correspond to the flow key "BGP Destination ASN" and thus may disclose the autonomous system number (ASN) used in the border gateway protocol (BGP) to uniquely identify a network or subnet of the Internet through which the network traffic flow may be traversing), and content/data for miscellaneous information pertinent to a network traffic flow (e.g., 8080, which may correspond to the flow key "Egress Port" and thus may disclose the outgoing network interface of the exporting network device through which the network traffic flow had been sent out from in order to continue along a path towards its final destination).

In another embodiment, a data record (422) may refer to a collection of one or more metadata values (432A-432N), which may correspond to one or more metadata keys (430A-430N), respectively, included in the options template record (416) (see e.g., FIG. 4C) associated with the template ID specified as the data set (418) set ID. A metadata value (432A-432N) may refer to content or data corresponding to the metadata, labeled by the metadata key (430A-430N), which describes the exporter, exporting process, or network traffic flow. Examples of a metadata value (432A-432N) include, but are not limited to, content/data directed to network device (or exporter) information (e.g., 199.221.66.10, which may correspond to the metadata key "Exporter IP Address" and thus may disclose the IP address associated with the network device exporting the flow tracking information), content/data directed to exportation process metadata (e.g., 3, which may correspond to the metadata key "Total Exported Message Count" and thus may disclose that the exported flow tracking information consists of three messages (see e.g., FIG. 4A)), and content/data directed to supplemental network traffic flow metadata (e.g., "Corporation1", which may correspond to the metadata key "Customer" and thus may disclose the customer name with which the network traffic flow is associated).

FIGS. 5A-5C show flowcharts describing a method for exporting flow tracking information in accordance with one or more embodiments. The various steps outlined below may be performed by one or more components of a network device (see e.g., FIG. 2A). Further, while the various steps in the flowcharts are presented and described sequentially, one of ordinary skill will appreciate that some or all steps may be executed in different orders, may be combined or omitted, and some or all steps may be executed in parallel. Moreover, an example scenario may unfold in conjunction with the various steps outlined below, which is for explanatory purposes only and not intended to limit the scope of the technology.

Turning to FIG. 5A, in Step 500, one or more data packets is received. In one embodiment, the data packet(s) may form a network traffic flow, which may have originated from a source host in the network. In Step 502, of the received data packet(s), a data packet is subsequently examined to obtain one or more packet internal qualifiers (PIQ). In one embodiment, a PIQ may refer to information, disclosed within the data packet (e.g., disclosed by the header information), which may be associated with the network traffic flow. For example, data packet information that may be representative of a PIQ may include, but is not limited to, any data link layer (L2) information disclosed therein (e.g., source MAC address, destination MAC address, etc.); any network layer (L3) information disclosed therein (e.g., source IP address, destination IP address, network layer protocol name, network layer protocol version, etc.); any transport layer (L4) information disclosed therein (e.g., source port, destination port, transport layer protocol name, transport layer protocol version, etc.); and any other information disclosed within the bounds of the data packet.

Example

PIQ-1: Source IP Address=1.1.1.1
PIQ-2: Destination IP Address=5.5.5.5
PIQ-3: Source MAC Address=00:AA:11:BB:22:CC
PIQ-4: Destination MAC Address=11:DD:22:EE:33:FF
PIQ-5: Source Port=190
PIQ-6: Destination Port=110
PIQ-7: VLAN ID=127

In Step 504, in association with the data packet(s) (received in Step 500), one or more packet external qualifiers (PEQ) is/are obtained. In one embodiment, a PEQ may refer to information, not found within the data packet (e.g., not disclosed by the header information), which may be associated with the network traffic flow. Examples of information that may be representative of a PEQ may include, but are not limited to, the ingress port (of the network device) through which the network traffic flow had been received, the autonomous system number (ASN) for the source IP address used in the border gateway protocol (BGP), the ASN for the destination IP address used in the BGP, the observed flow direction of the network traffic flow, the exporter (i.e., network device) IP address, and any other information associated with the network traffic flow that may be obtained outside the data packet.

Example
PEQ-1: Ingress Port=eth2
PEQ-2: Source IP BGP ASN=23400
PEQ-3: Destination IP BGP ASN=900
PEQ-4: Flow Direction=0 (ingress)
PEQ-5: Exporter IP Address=8.8.8.8

In Step 506, a lookup key is generated using at least the PIQ (obtained in Step 502) and the PEQ (obtained in Step 504). In one embodiment, the lookup key may represent a sequence of data items (i.e., pieces of information), which may conform to a predetermined sequence order. The predetermined sequence order may align with an order in which various data items may be arranged in a flow lookup table.

Example

| Lookup Key Sequence Order: | Lookup Key: |
|---|---|
| [ Source MAC; | [ 00:AA:11:BB:22:CC; |
| Source IP; | 1.1.1.1; |
| Source Port; | 190; |
| Source IP BGP ASN; | 23400; |
| Destination MAC; | 11:DD:22:EE:33:FF; |
| Destination IP; | 5.5.5.5; |
| Destination Port; | 110; |
| Destination IP BGP ASN; | 900; |
| VLAN ID; | 127; |
| Exporter IP; | 8.8.8.8; |
| Ingress Port; | eth2 |
| Flow Direction ] | 0 ] |

In Step 508, a lookup is performed on a flow lookup table (see e.g., FIG. 3B) using the lookup key (generated in Step 506). In one embodiment, the lookup may entail performing a sequential or parallel entry-by-entry comparison between the lookup key and each lookup table entry of the flow lookup table.

In Step 510, a determination is made as to whether a lookup table entry of the flow lookup table is identified as a result of the lookup (performed in Step 508). The determination may rely on whether at least a portion of the information specified in the lookup key (generated in Step 506) matches information specified in a lookup table entry. Accordingly, in one embodiment, if it is determined that a subset of the lookup key matches information specified in a lookup table entry, then a lookup table entry has been identified and the process may proceed to Step 514. On the other hand, in another embodiment, if it is alternatively determined that no portion of the lookup key matches any information specified in any lookup table entry, then none of the lookup table entries have been identified and the process may alternatively proceed to Step 512.

In Step 512, when having determined (in Step 510) that none of the lookup table entries of the lookup table have been identified based on the lookup (performed in Step 508), the data packet(s) (received in Step 500) is transmitted towards a destination host in the network. In one embodiment, the transmission of the data packet(s) may entail conventional routing and/or bridging through the network.

In Step 514, when having alternatively determined (in Step 510) that a lookup table entry of the lookup table has been identified based on the lookup (performed in Step 508), one or more flow values and a flow identifier (FID), specified in the identified lookup table entry, are obtained. In one embodiment, the flow value(s) obtained from the identified lookup table entry may encompass any and all flow values exhibiting content or data that mismatch a DO NOT CARE (DNC) or any other "wildcard" state. Thereafter, in Step 516, one or more flow keys, respective to the one or more flow values (obtained in Step 514), is identified. In one embodiment, a list of the flow keys exhibited in the flow lookup table may be recorded as flow lookup table metadata.

Example

| Lookup Table Flow Key Order: | Table Entry Flow Values: |
|---|---|
| [ Source MAC; | [ DNC (Do Not Care); |
| Source IP; | DNC; |
| Source Port; | DNC; |
| Source IP BGP ASN; | DNC; |
| Destination MAC; | DNC; |
| Destination IP; | 5.5.5.5; |
| Destination Port; | 110; |
| Destination IP BGP ASN; | DNC; |
| VLAN ID; | 127; |
| Exporter IP; | DNC; |
| Ingress Port; | DNC; |
| Flow Direction ] | DNC ] |

Obtained Flow Values = [ 5.5.5.5; 110; 127 ]
Identified Flow Keys = [ Destination IP; Destination Port; VLAN ID ]

In Step 518, a lookup is performed on a flow information table (see e.g., FIG. 3C) using the FID (obtained in Step 514). In one embodiment, the lookup may entail performing a sequential or parallel entry-by-entry comparison between the FID and contents of each information table entry of the information lookup table, in order to identify an information table entry wherein the FID is specified.

In Step 520, from the information table entry of the information lookup table identified based on the lookup (performed in Step 518), various data items are obtained. In one embodiment, these data items may include a flow template identifier (ID) (FTID), a metadata template ID (MTID), user tag information (UTI), and collector information (CI). Each of these data items are described in further detail above with respect to FIG. 3C.

Example

| Information Table Item Names: | Table Entry Item Values: |
|---|---|
| [ FID; | [ "F123"; |
| FTID; | 2000; |
| MTID; | 2208; |
| UTI; | ("Customer", "Corp9"); |
| CI ] | 3.3.3.3 (IP) ] |

In Step 522, a template record (see e.g., FIG. 4B) is generated. Specifically, in one embodiment, the template record may be generated using at least the FTID (obtained in Step 520) and the flow key(s) (identified in Step 516).

Example
Template Record:
[2000; "Destination IP"; "Destination Port"; "VLAN ID"]

Turning to FIG. 5B, in Step 540, following the generation of the template record (in Step 522), a template set (see e.g., FIG. 4B) is generated. In one embodiment, the template set may be generated using at least a first set identifier (SID) and the template record (generated in Step 522). The first SID may serve to uniquely identify the template set.

In Step 542, one or more metadata requests are issued to one or more packet screeners, respectively. In one embodiment, a metadata request may represent a query for screener-defined tag information (STI). STI may refer to screener-defined (i.e., packet screener (see e.g., FIG. 2A)-defined) metadata descriptive of a sought-to-be-tracked network traffic flow. Further, STI may take form as one or more screener-defined metadata key-value pairs. Specifically, each screener-defined metadata key-value pair may represent a data tuple that associates a screener-defined metadata key to a screener-defined metadata value. A screener-defined metadata key may refer to a name or label for some information (e.g., a tag) that a packet screener wishes to associate with the sought-to-be-tracked network traffic flow based on any analyses and/or processing (i.e., filtering) that the packet screener may perform on the data packet(s) (received in Step 500) in accordance with the packet screener role and configuration. Examples of a screener-defined metadata key may include, but are not limited to, labels identifying the filtering role performed by the packet screener and/or the outcome of the analyses (or processing) applied on the data packet(s) by the packet screener (e.g., "Screener Role", "Screener Deduction").

In one embodiment, a screener-defined metadata value, on the other hand, may refer to content or data, corresponding to a respective screener-defined metadata key, which the packet screener applies and associates with the sought-to-be-tracked network traffic flow. Following the aforementioned, exemplified screener-defined metadata keys, examples of a screener-defined metadata value may include, but are not limited to, content/data directed to identifying the filtering role with which the packet screener is associated (e.g., "intrusion", which may correspond to the screener-defined metadata key "Screener Role" and thus may disclose that the filtering role fulfilled by the packet screener is directed to intrusion detection); and content/data directed to classifying the sought-to-be-tracked network traffic flow based on packet screener filtering (e.g., "malicious", which may correspond to the screener-defined metadata key "Screener Deduction" and thus may disclose that, at least with respect to intrusion detection, the sought-to-be-tracked network traffic flow is suspected of carrying malicious elements).

In Step 544, one or more metadata responses are received from the above-mentioned one or more packet screeners, respectively. In one embodiment, a metadata response may represent a reply to a corresponding metadata request (issued in Step 542). Further, a metadata response may or may not include STI (described above). Whether STI is included or excluded may be contingent on the filtering results obtained by the packet screener from which the metadata response had been sent and may be based on performed analyses and/or processing applied to the data packet(s) of the received network traffic flow.

In Step 546, a determination is made as to whether any of the metadata responses (received in Step 544) include STI. Accordingly, in one embodiment, if it is determined that one or more screener-defined metadata key-value pairs have been received across the metadata response(s), then the process may proceed to Step 550. On the other hand, in another embodiment, if it is alternatively determined that zero screener-defined metadata key-value pairs have been received across the metadata response(s), then the process may alternatively proceed to Step 548.

In Step 548, after having determined (in Step 546) that no STI (i.e., zero screener-defined metadata key-value pairs) had been included in the metadata response(s) (received in Step 544), an options template record (see e.g., FIG. 4C) is generated. Specifically, in one embodiment, the options template record may be generated using at least the MTID (obtained in Step 520) and the user-defined metadata key(s) (or UTI) (also obtained in Step 520).

Example
Options Template Record: [2208; "Customer"]

In Step 550, after alternatively having determined (in Step 546) that STI (i.e., at least one screener-defined metadata key-value pair) had been included in the metadata response(s) (received in Step 544), an options template record (see e.g., FIG. 4C) is generated. In such an embodiment, the options template record may be generated using at least the MTID and user-defined metadata key(s) (obtained in Step 520), as well as the screener-defined metadata key(s) (or STI) (received in Step 544).

Example
Received STI: ("Screener Role", "intrusion");
("Screener Deduction", "malicious")
Options Template Record:
[2208; "Customer"; "Screener Role"; "Screener Deduction"]

In Step 552, an options template set (see e.g., FIG. 4C) is generated. In one embodiment, the options template set may be generated using at least a second SID and the options template record (generated either in Step 548 or Step 550). The second SID may serve to uniquely identify the options template set.

In Step 554, a first message (see e.g., FIG. 4A) is generated. In one embodiment, the first message may be generated using at least a network device identifier (NDID) associated with the network device exporting the flow tracking information, the template set (generated in Step 540), and the options template set (generated in Step 552).

Turning to FIG. 5C, in Step 560, following the generation of the first message (in Step 554), the first message is subsequently transmitted towards a flow collector (see e.g., FIG. 1). In one embodiment, transmission of the first message may rely on at least a portion of the CI (obtained in Step 520) and may employ a traffic analysis protocol (e.g., Internet Protocol Flow Information Export (IPFIX) protocol).

In Step 562, a first data record (see e.g., FIG. 4D) is generated. In one embodiment, the first data record may be generated using at least the flow value(s) (obtained in Step 514). Thereafter, in Step 564, a first data set (see e.g., FIG. 4D) is generated using at least the FTID (obtained in Step 520) and the first data record (generated in Step 562).

Example
First Data Record: [5.5.5.5; 110; 127]
First Data Set: [2000; [5.5.5.5; 110; 127]]

In Step 566, a second data record (see e.g., FIG. 4D) is generated. In one embodiment, the second data record may be generated using at least the user-defined metadata value(s) (or UTI) (obtained in Step 520). In another embodiment, the second data record may further be generated using the screener-defined metadata value(s) (or STI) (if any had been obtained in Step 544). In Step 568, a second data set (see e.g., FIG. 4D) is generated using at least the MTID (obtained in Step 520) and the second data record (generated in Step 566).

Example
Second Data Record:
["Corp9"] OR ["Corp9"; "intrusion"; "malicious"]
Second Data Set: [2208; ["Corp9"]] OR
[2208; ["Corp9"; "intrusion"; "malicious"]]

In Step 570, a second message (see e.g., FIG. 4A) is generated. In one embodiment, the second message may be generated using at least the NDID associated with the network device exporting the flow tracking information, the first data set (generated in Step 564), and the second data set (generated in Step 568).

In Step 572, the second message (generated in Step 570) is subsequently transmitted towards the above-mentioned flow collector. In one embodiment, like the circumstances of the first message, transmission of the second message may rely on at least a portion of the CI (obtained in Step 520) and may employ a traffic analysis protocol (e.g., Internet Protocol Flow Information Export (IPFIX) protocol).

In Step 574, at least a subset of the data packet(s) (received in Step 500) is replicated. In one embodiment, one or more packet samples—i.e., a copy of the data packet(s) subset—may be obtained as a result of the replication. Subsequently, in Step 576, a layer-2 (L2) frame (e.g., a media access control (MAC) frame) is generated. In one embodiment, the L2 frame may at least include the packet sample(s) (obtained in Step 574), the NDID associated with the network device exporting the flow tracking information, as well as the FTID and MTID (obtained in Step 520).

In Step 578, the L2 frame (generated in Step 576) is then encapsulated in an overlay tunnel packet (e.g., a virtual extensible local area network (VXLAN) frame). Thereafter, in Step 580, the overlay tunnel packet (obtained in Step 578) is subsequently transmitted towards a destination overlay tunnel endpoint (OTE) (e.g., a virtual tunnel end point (VTEP)) (see e.g., FIG. 2A). In one embodiment, the destination OTE may reside on a remote network device, which may be directly-connected to the above-mentioned flow collector. Further, transmission of the overlay tunnel packet over an overlay tunnel domain (e.g., a VXLAN domain), and towards the destination OTE, may rely on at least a portion of the CI (obtained in Step 520) and may employ an overlay tunnel protocol (e.g., VXLAN protocol).

In Step 582, the data packet(s) (received in Step 500) is transmitted towards a destination host in the network. In one embodiment, the transmission of the data packet(s) may entail conventional routing and/or bridging through the network.

Figure 6A:
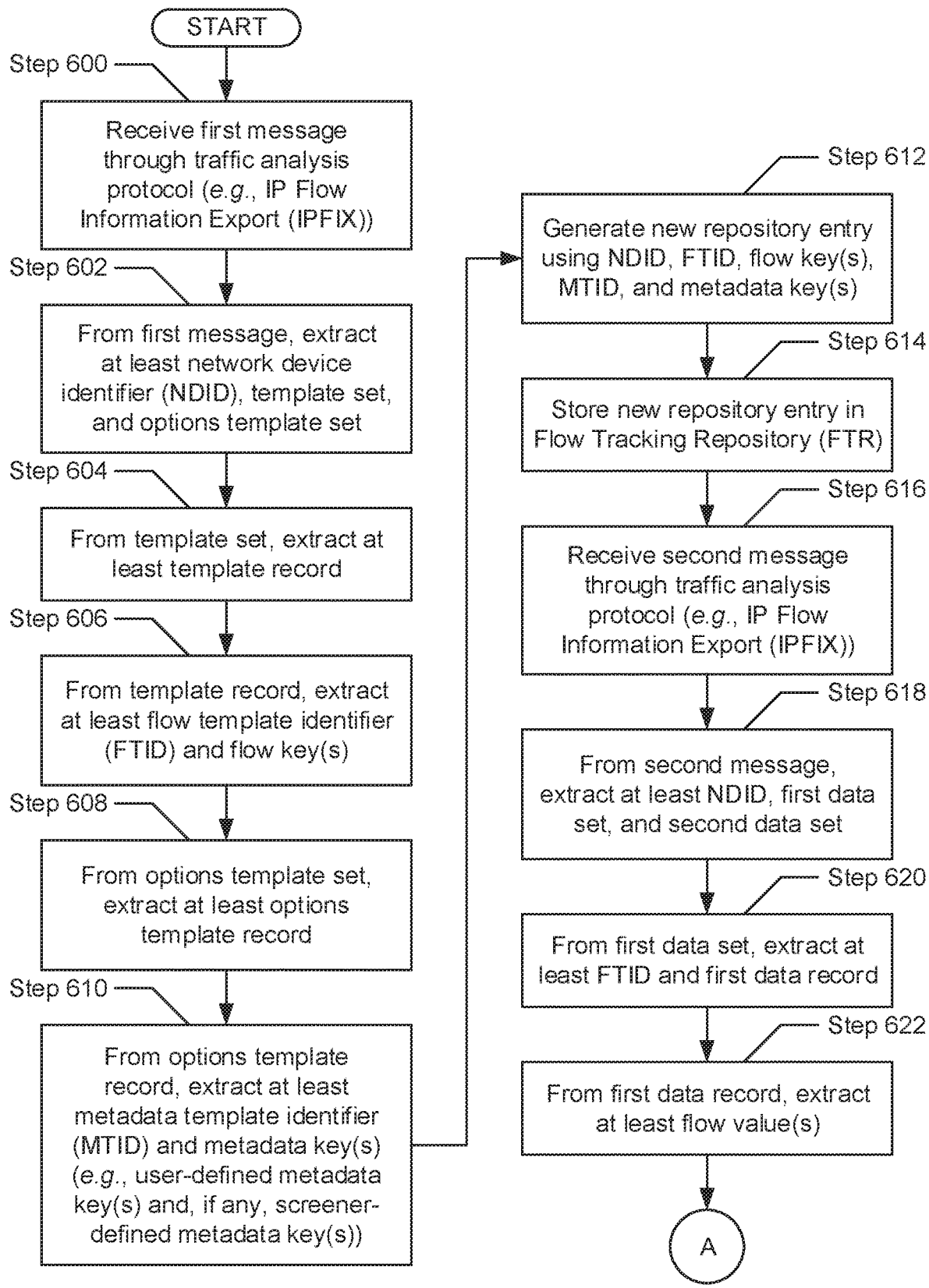
FIGS. 6A and 6B show flowcharts describing a method for consolidating exported flow tracking information in accordance with one or more embodiments.
Figure 6B:
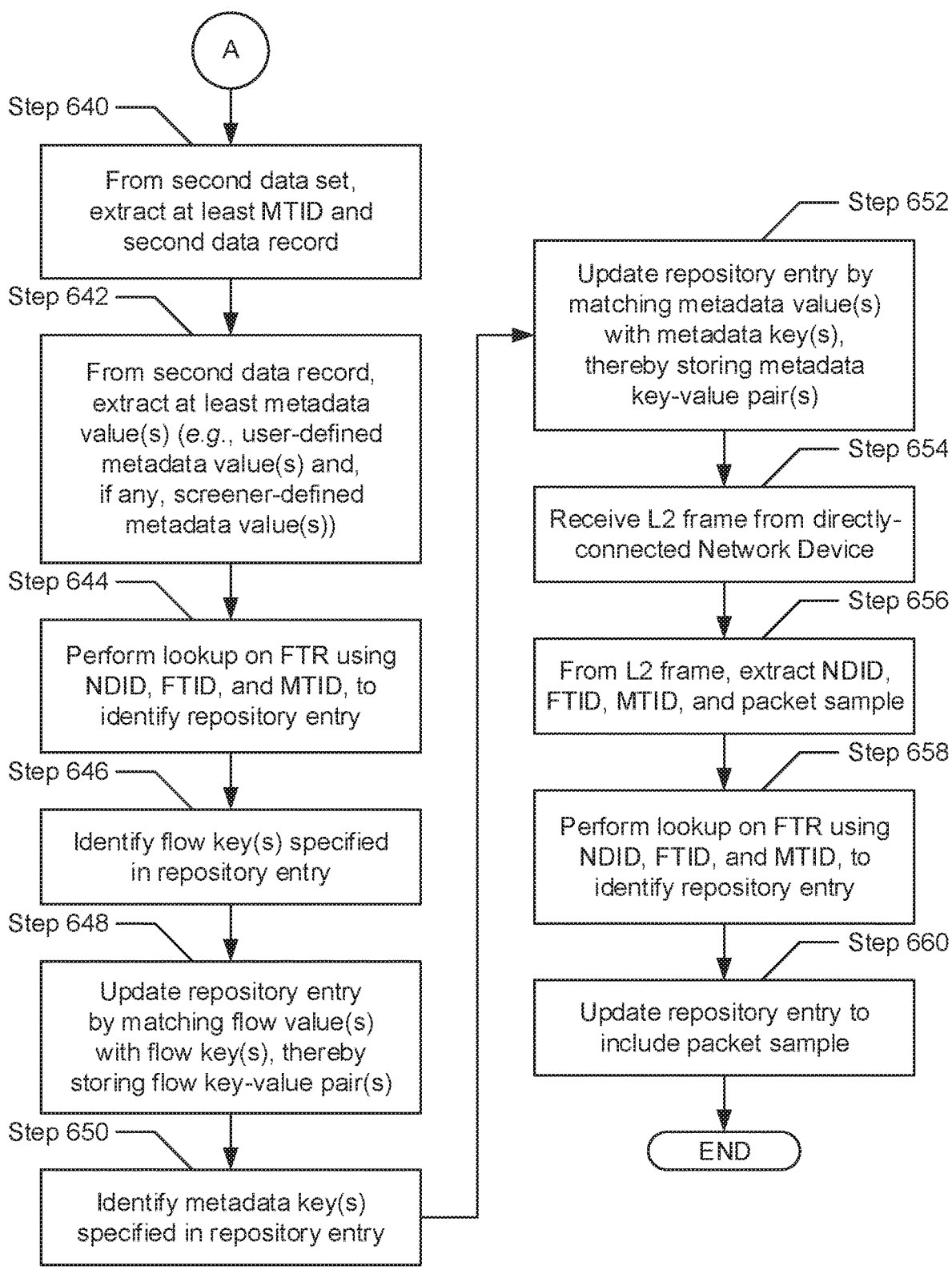

FIGS. 6A and 6B show flowcharts describing a method for consolidating exported flow tracking information in accordance with one or more embodiments. The various steps outlined below may be performed by one or more components of a flow collector (see e.g., FIG. 2B). Further, while the various steps in the flowcharts are presented and described sequentially, one of ordinary skill will appreciate that some or all steps may be executed in different orders, may be combined or omitted, and some or all steps may be executed in parallel. Moreover, an example scenario may unfold in conjunction with the various steps outlined below, which is for explanatory purposes only and not intended to limit the scope of the technology.

Turning to FIG. 6A, in Step 600, a first message is received by way of a traffic analysis protocol (e.g., Internet Protocol Flow Information Export (IPFIX) protocol). In one embodiment, the first message (see e.g., FIG. 4A) may include at least a portion of flow tracking information exported by a network device, where the flow tracking information may pertain to a sought-to-be-tracked network traffic flow that may have traversed the network device along its path towards a destination host in a network.

In Step 602, from the first message (received in Step 600), various data items (i.e., pieces of information) are extracted. In one embodiment, the various data items may at least include a network device identifier (NDID), a template set (see e.g., FIG. 4B), and an options template set (see e.g., FIG. 4C). The NDID (e.g., "Dev07") may refer to a unique identifier associated with the above-mentioned network device, which fulfills the role of the flow tracking information exporter.

Example
First Message: ["Dev07"; [Template Set]; [Options Template Set]]

In Step 604, from the template set (obtained in Step 602), at least a template record (see e.g., FIG. 4B) is extracted. Thereafter, in Step 606, from the aforementioned template record, at least a flow template identifier (FTID) and one or more flow keys are extracted.

Example
Template Set: [Set ID 1; [Template Record]]
Template Record:
[2000; "Destination IP"; "Destination Port"; "VLAN ID"]

In Step 608, from the options template set (obtained in Step 602), at least an options template record is extracted. Thereafter, in Step 610, from the aforementioned options template record, at least a metadata template identifier (MTID) and one or more metadata keys are extracted. In one embodiment, the metadata key(s) may include the name or label portion of user-defined tag information (UTI)). In another embodiment, the metadata key(s) may further include the name or label portion of screener-defined tag information (STI).

Example
Options Template Set: [Set ID 2; [Options Template Record]]
Options Template Record:
[2208; "Customer"; "Screener Role"; "Screener Deduction"]

In Step 612, a new repository entry is generated. In one embodiment, the new repository entry may be generated using the NDID (extracted in Step 602), the FTID and flow key(s) (extracted in Step 606), and the MTID and metadata key(s) (extracted in Step 610). Thereafter, in Step 614, the new repository entry (generated in Step 612) is subsequently stored in a flow tracking repository (FTR) (see e.g., FIGS. 2B and 3A).

Example

| FTR Item Names: | New Entry Item Values: |
|---|---|
| [ NDID; | [ "Dev07"; |
| FTID; | 2000; |
| Flow Key-Value Pair(s); | ("Destination IP", ?) |
|  | ("Destination Port", ?) |
|  | ("VLAN ID", ?); |
| MTID; | 2208; |
| Metadata Key-Value Pair(s); ] | ("Customer", ?) |
|  | ("Screener Role", ?) |
|  | ("Screener Deduction", ?) ] |

In Step 616, a second message (see e.g., FIG. 4A) is received by way of the above-mentioned traffic analysis protocol (e.g., IPFIX protocol) through which the first message had been received (in Step 600). In Step 618, from the second message (received in Step 616), at least the NDID (also obtained in Step 602), a first data set, and a second data set are extracted.

Example
Second Message: ["Dev07"; [First Data Set]; [Second Data Set]]

In Step 620, from the first data set (obtained in Step 618), at least the FTID (also obtained in Step 606) and a first data record are extracted. Thereafter, in Step 622, from the aforementioned first data record, at least one or more flow values are extracted. In one embodiment, the extracted flow value(s) each represent content or data respective to a different flow key (i.e., name or label) (extracted from the template record in Step 606).

Example

First Data Set: [2000; [First Data Record]]

First Data Record: [5.5.5.5; 110; 127]

Turning to FIG. 6B, in Step 640, from the second data set (obtained in Step 618), at least the MTID (also obtained in Step 610) and a second data record are extracted. Thereafter, in Step 642, from the aforementioned second data record, at least one or more metadata values are extracted. In one embodiment, the extracted metadata value(s) each represent content or data respective to a different metadata key (i.e., name or label) (extracted from the options template record in Step 610).

Example

Second Data Set: [2208; [Second Data Record]]

Second Data Record: ["Corp9"; "intrusion"; "malicious"]

In Step 644, a lookup is performed on the FTR (see e.g., FIG. 3A) using the NDID, FTID, and MTID (obtained in Steps 602, 606, 618, and/or 620). In one embodiment, the lookup may entail performing a sequential or parallel entry-by-entry comparison between the NDID, FTID, and MTID, as well as contents of each repository entry of the FTR, in order to identify a repository entry wherein the NDID, FTID, and MTID are all specified.

In Step 646, within the repository entry of the FTR identified based on the lookup (performed in Step 644), one or more flow keys is identified. Thereafter, in Step 648, the identified repository entry is subsequently updated. Specifically, in one embodiment, updating of the identified repository entry may entail populating each incomplete flow key-value pair (i.e., the flow key(s)) (identified in Step 646) with the respective flow value (extracted from the first data record in Step 622).

Example

Updated New Entry Item Values:
[       "Dev07";
        2000;
        ("Destination IP", 5.5.5.5),
        ("Destination Port", 110),
        ("VLAN ID", 127);
        2208;
        ("Customer", ?)
        ("Screener Role", ?)
        ("Screener Deduction", ?)    ]

In Step 650, within the repository entry of the FTR identified based on the lookup (performed in Step 644), one or more metadata keys is identified. Thereafter, n Step 652, the identified repository entry is further updated. Specifically, in one embodiment, further updating of the identified repository entry may entail populating each incomplete metadata key-value pair (i.e., the metadata key(s)) (identified in Step 650) with the respective metadata value (extracted from the second data record in Step 642).

Example

Updated New Entry Item Values:
[       "Dev07";
        2000;
        ("Destination IP", 5.5.5.5), -continued ("Destination Port", 110),
("VLAN ID", 127);
2208;
("Customer", "Corp9"),
("Screener Role", "intrusion"),
("Screener Deduction", "malicious")    ]

In Step 654, a layer-2 (L2) frame (e.g., a media access control (MAC) frame) is received. In one embodiment, the L2 frame may have been bridged over to the flow collector from a directly-connected network device, whereon a destination overlay tunnel endpoint (OTE) may reside. Further, the L2 frame may have been obtained by the aforementioned network device following the reception and decapsulation of an overlay tunnel packet (e.g., a virtual extensible local area network (VXLAN) frame). The overlay tunnel packet may have been transmitted, through an overlay tunnel domain (e.g., a VXLAN domain), by the network traffic flow exporter.

In Step 656, from the L2 frame (received in Step 654), at least the NDID (also obtained in Step 602 or 618), the FTID (also obtained in Step 606), the MTID (also obtained in Step 620), and one or more packet samples are extracted.

In Step 658, a lookup is performed on the FTR (see e.g., FIG. 3A) using the NDID, FTID, and MTID (obtained in Step 656). In one embodiment, the lookup may entail performing a sequential or concurrent entry-by-entry comparison between the NDID, FTID, and MTID, as well as contents of each repository entry of the FTR, in order to identify a repository entry wherein the NDID, FTID, and MTID are all specified. Thereafter, in Step 660, the repository entry of the FTR identified based on the lookup (performed in Step 658) is updated. That is, in one embodiment, updating of the identified repository entry may entail appending the packet sample(s) (extracted from the L2 frame in Step 656) to the existing flow tracking information specified therein.

Example

Updated New Entry Item Values:
[       "Dev07";
        2000;
        ("Destination IP", 5.5.5.5),
        ("Destination Port", 110),
        ("VLAN ID", 127);
        2208;
        ("Customer", "Corp9"),
        ("Screener Role", "intrusion"),
        ("Screener Deduction", "malicious");
        [ Packet Sample(s) ]    ]

While the invention has been described with respect to a limited number of embodiments, those skilled in the art, having benefit of this disclosure, will appreciate that other embodiments can be devised which do not depart from the scope as disclosed herein. Accordingly, the scope should be limited only by the attached claims.

What is claimed is:

1. A method for exporting flow tracking information, comprising:
receiving, by a processor of a network device, a network traffic flow comprising a data packet;
generating, by the processor, a lookup key using at least a set of packet internal qualifiers extracted from the data packet;

obtaining, by the processor and based on the lookup key, a flow value, a flow key corresponding to the flow value, and a user-defined metadata key-value pair comprising a user-defined metadata key mapped to a user-defined metadata value;

exporting, by the processor, a first portion of the flow tracking information comprising the flow key and the user-defined metadata key and a second portion of the flow tracking information comprising the flow value and the user-defined metadata value, prior to exporting the first portion of the flow tracking information:
obtaining, based on the lookup key, a metadata template identifier (MTID).

2. The method of claim 1, further comprising:
prior to exporting the first portion of the flow tracking information:
obtaining, based on the lookup key, a flow template identifier (FTID).

3. The method of claim 2, wherein exporting the first portion of the flow tracking information, comprises:
generating a template set comprising the FTID and the flow key, and an options template set comprising the MTID and the user-defined metadata key;
generating a message comprising a network device identifier (NDID), the template set, and the options template set; and
transmitting the message to a flow collector using a traffic analysis protocol.

4. The method of claim 3, wherein the traffic analysis protocol is an Internet Protocol Flow Information Export (IPFIX) protocol.

5. The method of claim 3, further comprising:
prior to generating the options template set:
obtaining, from a packet screener, screener tag information (STI) comprising a screener-defined metadata key,
wherein the options template set further comprises the screener-defined metadata key.

6. The method of claim 2, wherein exporting the second portion of the flow tracking information, comprises:
generating a first data set comprising the FTID and the flow value, and a second data set comprising the MTID and the user-defined metadata value;
generating a message comprising a network device identifier (NDID), the first data set, and the second data set; and
transmitting the message to a flow collector using a traffic analysis protocol.

7. The method of claim 6, further comprising:
prior to generating the second data set:
obtaining, from a packet screener, screener tag information (STI) comprising a screener-defined metadata value,
wherein the second data set further comprises the screener-defined metadata value.

8. The method of claim 2, further comprising:
replicating at least a portion of the data packet to obtain a packet sample; and
exporting a third portion of the flow tracking information comprising the packet sample.

9. The method of claim 8, wherein exporting the third portion of the flow tracking information, comprises:
generating a layer-2 (L2) frame comprising a network device identifier (NDID), the FTID, the MTID, and the packet sample;

encapsulating the L2 frame into an overlay tunnel packet; and
transmitting the overlay tunnel packet to a remote overlay tunnel endpoint (OTE) using an overlay tunnel protocol,
wherein the remote OTE resides on a remote network device directly-connected to a flow collector.

10. The method of claim 9, wherein the overlay tunnel packet is a virtual extensible local area network (VXLAN) frame, wherein the remote OTE is a virtual tunnel end point (VTEP), and wherein the overlay tunnel protocol is a VXLAN protocol.

11. The method of claim 1, wherein the MTID is a fixed-length numerical value that uniquely identifies an options template record.

12. A network device configured to export flow tracking information, comprising:
a computer processor programmed to:
receive a network traffic flow comprising a data packet;
generate a lookup key using at least a set of packet internal qualifiers extracted from the data packet;
obtain, based on the lookup key, a flow value, a flow key corresponding to the flow value, and a user-defined metadata key-value pair comprising a user-defined metadata key mapped to a user-defined metadata value; and
export a first portion of the flow tracking information comprising the flow key and the user-defined metadata key and a second portion of the flow tracking information comprising the flow value and the user-defined metadata value,
prior to exporting the first portion of the flow tracking information:
obtaining, based on the lookup key, a metadata template identifier (MTID).

13. The network device of claim 12, further comprising:
a flow collector operatively connected to the network device,
wherein the flow tracking information is exported to the flow collector.

14. The network device of claim 13, further comprising:
a second flow collector operatively connected to the network device,
wherein the flow tracking information is further exported to the second flow collector.

15. The network device of claim 13, further comprising:
a flow analyzer operatively connected to the flow collector,
wherein the flow analyzer is programmed to analyze the flow tracking information.

16. The network device of claim 12, wherein the network device is a switch, a router, or a multilayer switch.

17. A non-transitory computer readable medium (CRM) comprising computer readable program code, which when executed by a computer processor, enables the computer processor to:
receive a network traffic flow comprising a data packet;
generate a lookup key using at least a set of packet internal qualifiers extracted from the data packet;
obtain, based on the lookup key, a flow value, a flow key corresponding to the flow value, and a user-defined metadata key-value pair comprising a user-defined metadata key mapped to a user-defined metadata value; and
export a first portion of the flow tracking information comprising the flow key and the user-defined metadata key and a second portion of the flow tracking information comprising the flow value and the user-defined metadata value,
prior to exporting the first portion of the flow tracking information:
obtaining, based on the lookup key, a metadata template identifier (MTID).

18. The non-transitory CRM of claim 17, further comprising computer readable program code, which when executed by the computer processor, enables the computer processor to:
prior to exporting the first portion of the flow tracking information:
obtain, based on the lookup key, a flow template identifier (FTID).

19. The non-transitory CRM of claim 18, further comprising computer readable program code, which when executed by the computer processor, enables the computer processor to:
export the first portion of the flow tracking information, by:
generating a template set comprising the FTID and the flow key, and an options template set comprising the MTID and the user-defined metadata key;
generating a message comprising a network device identifier (NDID), the template set, and the options template set; and
transmitting the message to a flow collector using a traffic analysis protocol.

20. The non-transitory CRM of claim 19, wherein the traffic analysis protocol is an Internet Protocol Flow Information Export (IPFIX) protocol.

* * * * *